US012517446B2

(12) United States Patent
Tomii

(10) Patent No.: US 12,517,446 B2
(45) Date of Patent: Jan. 6, 2026

(54) IMAGE FORMING APPARATUS FOR PERFORMING CALIBRATION TO CONTROL A DENSITY UNEVENNESS

(71) Applicant: CANON KABUSHIKI KAISHA, Tokyo (JP)

(72) Inventor: Hiroshi Tomii, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/774,743

(22) Filed: Jul. 16, 2024

(65) Prior Publication Data

US 2024/0369952 A1 Nov. 7, 2024

Related U.S. Application Data

(63) Continuation of application No. 18/060,519, filed on Nov. 30, 2022, now Pat. No. 12,072,643.

(30) Foreign Application Priority Data

Dec. 8, 2021 (JP) ................................ 2021-199626

(51) Int. Cl.
*G03G 15/00* (2006.01)
*G03G 15/043* (2006.01)

(52) U.S. Cl.
CPC ....... *G03G 15/043* (2013.01); *G03G 15/5041* (2013.01); *G03G 15/5058* (2013.01); *G03G 2215/00042* (2013.01)

(58) Field of Classification Search
CPC ............ G03G 15/043; G03G 15/5016; G03G 15/5041; G03G 15/5058; G03G 15/5062; G03G 2215/00042; G03G 2215/00067; G03G 2215/00569
See application file for complete search history.

(56) References Cited

U.S. PATENT DOCUMENTS

2017/0153588 A1* 6/2017 Tanaka ................. G03G 15/043
2021/0302886 A1* 9/2021 Yokote ............... G03G 15/5062
2022/0091551 A1* 3/2022 Takemura .......... G03G 15/5041

* cited by examiner

*Primary Examiner* — Sophia S Chen
(74) *Attorney, Agent, or Firm* — Canon U.S.A., Inc. IP Division

(57) ABSTRACT

An image forming apparatus includes an image forming unit including a photosensitive member, a light source, and a developing roller, and a controller configured to control the image forming unit to form a detection image, obtain density data regarding density levels in a plurality of areas in the detection image at a plurality of positions in a scanning direction in which the photosensitive member is scanned with the light from the light source, generate, based on the density data, a first image forming condition for forming a first test image and a second image forming condition for forming a second test image, the second image forming condition being different from the first image forming condition, and control the image forming unit to form the first test image and the second test image, respectively based on the first image forming condition and the second image forming condition.

15 Claims, 19 Drawing Sheets

FIG.7

| | Gain1 | Gain2 | Gain3 | Gain4 | Gain5 |
|---|---|---|---|---|---|
| Gain VALUE | 50 | 100 | 150 | 200 | 250 |
| ΔDens | ΔLPW1 | ΔLPW2 | ΔLPW3 | ΔLPW4 | ΔLPW5 |
| 0.00 | 0 | 0 | 0 | 0 | 0 |
| 0.01 | 1 | 1 | 2 | 2 | 3 |
| 0.02 | 1 | 2 | 3 | 4 | 5 |
| 0.03 | 2 | 3 | 5 | 6 | 8 |
| 0.04 | 2 | 4 | 6 | 8 | 10 |
| 0.05 | 3 | 5 | 8 | 10 | 13 |
| 0.06 | 3 | 6 | 9 | 12 | 15 |
| 0.07 | 4 | 7 | 11 | 14 | 18 |
| 0.08 | 4 | 8 | 12 | 16 | 20 |
| 0.09 | 5 | 9 | 14 | 18 | 23 |
| 0.10 | 5 | 10 | 15 | 20 | 25 |

FIG.8

| | | | Gain1 | Gain2 | Gain3 | Gain4 | Gain5 |
|---|---|---|---|---|---|---|---|
| POSITION | BEFORE CORRECTION | ΔDens | ΔLPW1 | ΔLPW2 | ΔLPW3 | ΔLPW4 | ΔLPW5 |
| A | 0.56 | -0.04 | -2 | -4 | -6 | -9 | -11 |
| B | 0.60 | 0.00 | 0 | 0 | 0 | -1 | -1 |
| C | 0.61 | 0.01 | 0 | 1 | 1 | 1 | 2 |
| D | 0.61 | 0.01 | 0 | 1 | 1 | 1 | 2 |
| E | 0.62 | 0.02 | 1 | 2 | 3 | 3 | 4 |
| F | 0.63 | 0.03 | 1 | 3 | 4 | 5 | 7 |
| G | 0.63 | 0.03 | 1 | 3 | 4 | 5 | 7 |
| H | 0.63 | 0.03 | 1 | 3 | 4 | 5 | 7 |
| I | 0.62 | 0.02 | 1 | 2 | 3 | 3 | 4 |
| J | 0.60 | 0.00 | 0 | 0 | 0 | -1 | -1 |
| K | 0.59 | -0.01 | -1 | -1 | -2 | -3 | -3 |
| L | 0.59 | -0.01 | -1 | -1 | -2 | -3 | -3 |
| M | 0.58 | -0.02 | -1 | -2 | -3 | -5 | -6 |
| N | 0.57 | -0.03 | -2 | -3 | -5 | -7 | -8 |

FIG.15

DENSITY DIFFERENCE AMOUNT

| | | IMAGE SIGNAL | | | |
|---|---|---|---|---|---|
| | | 25% | 50% | 75% | 100% |
| POSITION IN MAIN SCANNING DIRECTION | 1 | 0.02 | 0.01 | 0.05 | 0.04 |
| | 2 | 0.01 | 0.01 | 0.05 | 0.03 |
| | 3 | 0.00 | 0.01 | 0.02 | 0.02 |
| | 4 | 0.00 | 0.01 | -0.01 | 0.00 |
| | 5 | 0.00 | 0.00 | -0.01 | -0.02 |
| | 6 | 0.00 | 0.00 | -0.01 | -0.03 |
| | 7 | 0.00 | 0.00 | -0.01 | -0.05 |
| | 8 | 0.00 | -0.01 | -0.01 | -0.05 |
| | 9 | 0.00 | -0.01 | -0.01 | -0.05 |
| | 10 | -0.01 | -0.01 | -0.01 | -0.05 |
| | 11 | -0.01 | -0.01 | -0.01 | -0.03 |
| | 12 | -0.01 | -0.02 | -0.01 | -0.03 |
| | 13 | -0.01 | -0.02 | -0.01 | -0.03 |
| | 14 | -0.01 | -0.02 | -0.01 | -0.02 |
| | 15 | -0.01 | -0.02 | -0.01 | -0.02 |
| | 16 | -0.01 | -0.02 | -0.05 | -0.02 |
| | 17 | -0.02 | -0.02 | -0.07 | -0.01 |
| | 18 | -0.02 | -0.02 | -0.10 | 0.00 |
| | 19 | -0.02 | -0.02 | -0.09 | 0.00 |
| | 20 | -0.02 | -0.01 | -0.08 | 0.01 |
| | 21 | -0.02 | -0.01 | -0.07 | 0.01 |
| | 22 | -0.01 | 0.00 | -0.06 | 0.01 |
| | 23 | -0.01 | 0.00 | -0.01 | 0.02 |
| | 24 | 0.00 | 0.01 | -0.01 | 0.02 |
| | 25 | 0.00 | 0.01 | -0.01 | 0.03 |
| | 26 | 0.00 | 0.01 | -0.01 | 0.04 |
| | 27 | 0.01 | 0.02 | 0.03 | 0.04 |
| | 28 | 0.02 | 0.02 | 0.05 | 0.04 |
| | 29 | 0.03 | 0.03 | 0.07 | 0.05 |
| | 30 | 0.03 | 0.04 | 0.07 | 0.06 |
| | 31 | 0.03 | 0.05 | 0.09 | 0.07 |
| | 32 | 0.04 | 0.06 | 0.10 | 0.07 |

FIG.18

| CORRECTION REFLECTION RATIO [%] | PRESENCE OF PSEUDO CONTOUR | |
|---|---|---|
| | STATE α | STATE β |
| 100 | YES | YES |
| 90 | YES | NO |
| 80 | YES | NO |
| 70 | NO | NO |
| 60 | NO | NO |

IMAGE FORMING APPARATUS FOR PERFORMING CALIBRATION TO CONTROL A DENSITY UNEVENNESS

CROSS-REFERENCE TO RELATED APPLICATIONS

This application is a Continuation of U.S. patent application Ser. No. 18/060,519 filed Nov. 30, 2022, which claims priority benefit of Japanese Application No. 2021-199626 filed Dec. 8, 2021. The disclosures of the above-named applications are hereby incorporated by reference herein in their entireties.

BACKGROUND

Field of the Disclosure

The present disclosure relates to a shading correction for correcting density unevenness in a scanning direction.

Description of the Related Art

In electro-photographic image forming apparatuses, density values which deviate from the intended value (hereinafter referred to as density unevenness) may occur in a scanning direction in which an output image is scanned, due to various factors in image forming processes (e.g., sensitivity unevenness of photosensitive drum and exposure unevenness of exposure device). As a technique for correcting such density unevenness in the output image in the scanning direction, there is known a control method of correcting the density unevenness in the output image by light amount correction of the exposure device, based on the density unevenness detected using a detection pattern (i.e., pattern used for detection). The control method is referred to as a main scanning shading by laser power (hereinbelow, referred to as LPWSHD).

In a technique proposed in Japanese Patent Application Laid-open No. 2019-2981, test patterns each having a density that is aimed to be brought closer to a target density under different environmental conditions (the test patterns have image densities different from each other) are formed on a recording medium. Density data of each of the test patterns on the recording medium is then obtained, and an average image density of each of the test patterns is obtained. From among these test patterns, the test pattern having the closest image density to the target image density is selected. A light quantity correction amount in an optimum density range is then determined by calculating an exposure correction value based on the selected density data of the test pattern. Thus, on the environmental condition that the temperature around the image forming apparatus is high, a test pattern having a target density under the high-temperature environment is selected. In contrast, on the environmental condition that the temperature around the image forming apparatus is low, a test pattern having a target density under the low-temperature environment is selected. This is because if the density of the test pattern changes depending on the environmental condition, the density unevenness cannot be corrected at a high accuracy.

As a density unevenness correction method in the scanning direction, there is also known a control method of correcting the density unevenness by generating a plurality of conversion conditions corresponding to different positions in the scanning direction. The control method is referred to as a main scanning shading by a look-up table (hereinbelow, referred to as LUTSHD).

Japanese Patent Application Laid-open No. 2021-24249 discusses a technique for preventing a pseudo contour due to an over correction and a technique for obtaining a high correction accuracy in the LUTSHD, by changing a correction reflection ratio depending on the number of sheets each with the test pattern formed thereon. A user sets the number of sheets to form the test pattern thereon. In the technique discussed in Japanese Patent Application Laid-open No. 2021-24249, an average value of density levels of a plurality of sheets is obtained. Thus, it can be regarded that data with a general density with the density deviation controlled is obtained as the number of sheets increases, and the correction reflection ratio is increased.

SUMMARY

According to an aspect of the present disclosure, an image forming apparatus includes an image forming unit including a photosensitive member, a light source configured to expose the photosensitive member to light to form an electrostatic latent image, and a developing roller configured to develop the electrostatic latent image on the photosensitive member, and a controller. The controller is configured to control the image forming unit to form a detection image, obtain density data regarding density levels in a plurality of areas the detection image at a plurality of positions in a scanning direction in which the photosensitive member is scanned with the light from the light source, generate, based on the density data, a first image forming condition for forming a first test image in which a density unevenness in the scanning direction is adjusted, generate, based on the density data, a second image forming condition for forming a second test image in which the density unevenness in the scanning direction is adjusted, the second image forming condition being different from the first image forming condition, and control the image forming unit to form the first test image and the second test image, respectively based on the first image forming condition and the second image forming condition.

Further features of the present disclosure will become apparent from the following description with reference to the attached drawings.

BRIEF DESCRIPTION OF THE DRAWINGS

FIG. 7 is a table illustrating exposure correction amount difference corresponding one-to-one to different gains.

FIG. 8 is a table illustrating examples of the exposure correction amount obtained from the different gains and a different density profile.

FIG. 15 is a table illustrating a density difference amount for each gradation level.

FIG. 18 is a table illustrating an effect by other correction processing.

DESCRIPTION OF THE EMBODIMENTS

<Image Forming Apparatus>

Figure 1:
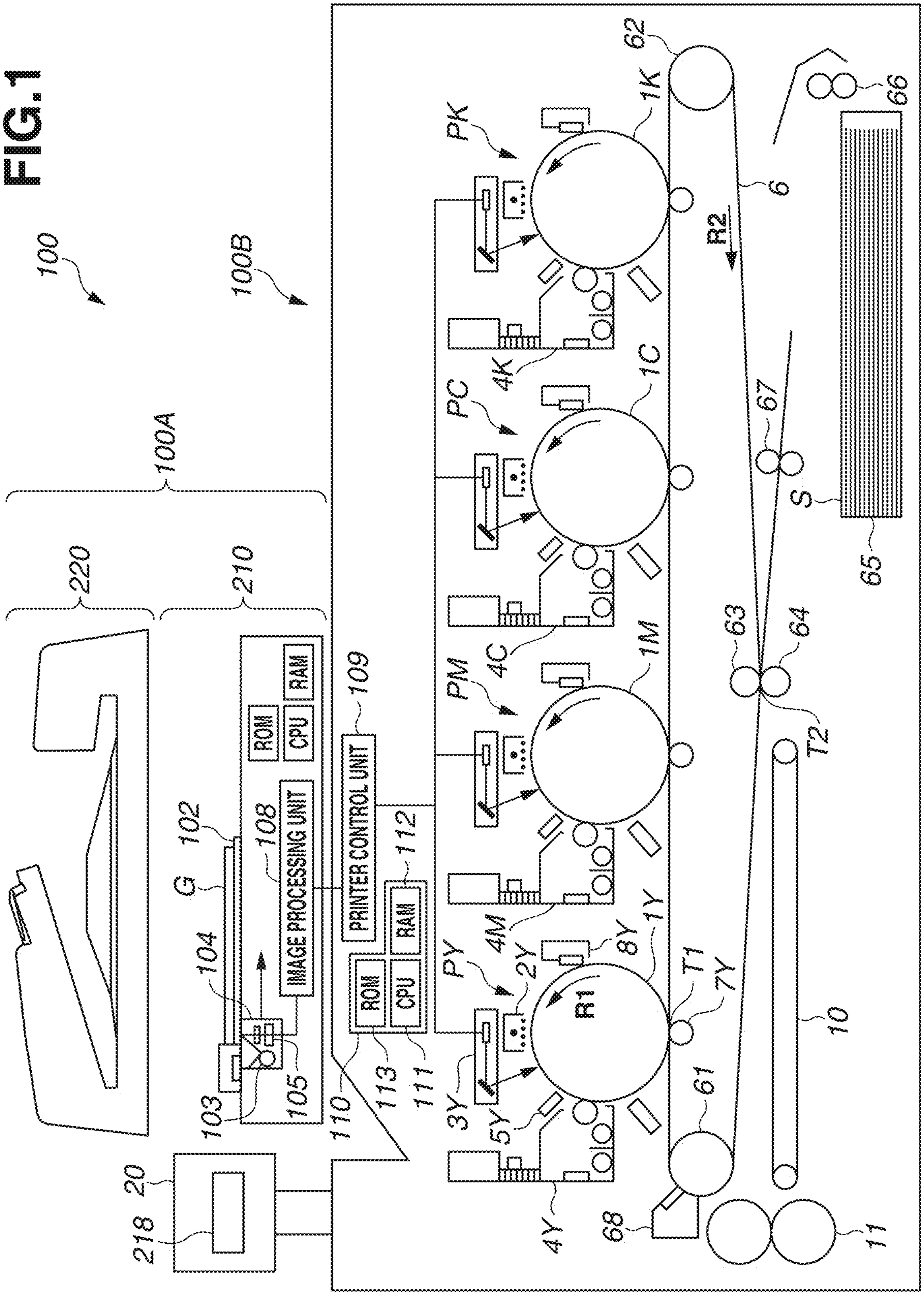
FIG. 1 is a schematic sectional diagram of an image forming apparatus.

A first embodiment of the present disclosure will be described below. FIG. 1 is a schematic sectional diagram of an image forming apparatus 100. The image forming apparatus 100 includes an operation unit 20, an image reading unit (reader unit) 100A for reading an image of an original document G, and a printer unit 100B for forming an image based on the image data. The operation unit 20 includes a display unit 218. The operation unit 20 is connected to a control unit 110 and the image reading unit 100A. The operation unit 20 is used to receive a user's operation.

The image forming apparatus 100 is a color laser printer that forms an image using developers (toners) of yellow (Y), magenta (M), cyan (C), and black (K). The image forming apparatus 100 may be configured as any one of, for example, a printing apparatus, a printer, a copying machine, a multi-function peripheral (MFP), and a facsimile machine. Hereinbelow, letters Y, M, C, and K added to the respective trailing ends of reference symbols indicate that the colors of developers (toners) targeted by corresponding components are Y, M, C, and K, respectively. In the following descriptions, in a case where it is not necessary to distinguish colors, the reference symbols with the Y, M, C, and K omitted are used.

The image forming apparatus 100 includes four image forming units P (image forming unit PY, PM, PC, and PK) for forming images using toners of different colors (Y, M, C, and K), respectively. The image forming units PY, PM, PC, and PK are included in the printer unit 100B. As illustrated in FIG. 1, the image forming apparatus 100 is configured as a tandem type intermediate transfer system color printer in which the image forming units PY, PM, PC, and PK are disposed along a moving direction of an intermediate transfer belt 6 in this order.

The image forming units PY, PM, PC, and PK each employ a similar configuration except that the toner colors used by developing devices 4Y, 4M, 4C, and 4K are different. In FIG. 1, for the sake of simplification, reference symbols of a part of components corresponding to M, C, and K of the image forming units PM, PC, and PK are not described.

<Image Reading Unit>

The image reading unit 100A includes a document scanner 210 and an automatic document feeding device (hereinbelow, referred to as an ADF) 220. The document scanner 210 can perform image reading using "ADF reading" for reading the original document G fed by the ADF 220 and "document platen reading" for reading the original document G placed on a document platen glass 102.

The image reading unit 100A includes a light source 103, an optical system 104, and a reading sensor 105. The light source 103 emits light to the original document G. The emitted light is reflected by the original document G. The optical system 104 includes a lens and other components, and forms an image of the light reflected by the original document G onto a light receiving surface of the reading sensor 105. The reading sensor 105 is, for example, a Charge-Coupled Device (CCD) sensor, and receives the reflected light focused on the light receiving surface. The image reading unit 100A generates image data representing the image of the original document G corresponding to the reflected light received by the reading sensor 105, and transmits the generated image data to the printer unit 100B. The light source 103, the optical system 104, and the reading sensor 105 are integrally formed as a reading unit, and move in a direction indicated by an arrow illustrated in FIG. 1. In this way, the entire image of the original document G is read by the reading sensor 105.

The reading sensor 105 outputs luminance values corresponding to the received reflected light. In a case where shading is performed, the luminance values are converted into density values by an image processing unit 108.

<Printer Unit>

As for the printer unit 100B, descriptions are mainly provided of Y components, since the M, C, and K components are similar to the Y components except for colors. The printer unit 100B performs image formation based on the image data generated by the image reading unit 100A. The printer unit 100B can also perform image formation based on image data received from an external apparatus via a network or a telephone line.

The printer unit 100B includes the control unit 110 for controlling the entire image forming apparatus 100. The control unit 110 includes a central processing unit (CPU) 111, a random access memory (RAM) 112, and a read-only memory (ROM) 113. The printer unit 100B further includes a printer control unit 109 for controlling an image forming operation (printing operation) using the image forming units PY, PM, PC, and PK. The configuration of the image forming apparatus 100 is not limited to the configuration having the printer control unit 109 to control the image forming operation, and, for example, may have a configuration in which the control unit 110 also controls the image forming operation.

The image forming units P each include a photosensitive drum (photosensitive member) 1, and components that are arranged near the photosensitive drum 1, namely, a charging device 2, an exposure device 3, the developing device 4, a potential sensor 5, a primary transfer roller 7, and a cleaning device 8. The photosensitive drum 1 rotates in an arrow R1 direction. The charging device 2 charges the surface of the photosensitive drum 1 to a predetermined potential.

The exposure device 3 emits a laser beam (light beam) based on the input image signal (input image data) to expose the photosensitive drum 1 by scanning the laser beam on the surface of the photosensitive drum 1. In this way, an electrostatic latent image is formed on the photosensitive drum 1 based on the input image data. The exposure device 3 includes a rotational multifaceted mirror (hereinbelow, referred to as a polygon mirror) for scanning the laser beam. The polygon mirror deflects the laser beam so as to scan the surface of the photosensitive drum 1 with the laser beam by emitting the laser beam to one of a plurality of reflection surfaces. The exposure device 3 functions as an exposure unit for exposing the photosensitive drum 1 to form the electrostatic latent image.

The developing device 4 includes a developing roller for bearing and supplying toner to the photosensitive drum 1, and develops the electrostatic latent image by attaching toner born on the developing roller to the electrostatic latent image on the photosensitive drum 1. In this way, a toner image is formed on the photosensitive drum 1. The potential sensor 5 is disposed near the photosensitive drum 1 and between the developing device 4 and the exposure position to which the exposure device 3 performs exposure. The potential sensor 5 can detect the potential of the electrostatic latent image formed on the photosensitive drum 1.

The primary transfer roller 7 presses the inner surface of the intermediate transfer belt 6 to form a primary transfer nip portion T1 between the photosensitive drum 1 and the intermediate transfer belt 6. The primary transfer roller 7 transfers the toner image born on the photosensitive drum 1 onto the intermediate transfer belt 6 by a transfer bias voltage being applied.

The cleaning device 8 collects toner remaining on the photosensitive drum 1 after the toner image is transferred onto the intermediate transfer belt 6.

The four color toner images each formed on the corresponding one of the photosensitive drums 1Y, 1M, 1C, and 1K in the image forming units PY, PM, PC, and PK are sequentially transferred onto the intermediate transfer belt 6 in an overlapped manner (primary transfer). Thus, a multicolor toner image including Y, M, C, and K is formed on the intermediate transfer belt 6.

The intermediate transfer belt 6 is supported by a tension roller 61, a drive roller 62, and an opposing roller 63, and is driven by the drive roller 62, and rotates at a predetermined speed in an arrow R2 direction. The toner image formed on the intermediate transfer belt 6 is conveyed, along with the rotation of the intermediate transfer belt 6, to a secondary transfer nip portion T2 of the intermediate transfer belt 6 and a secondary transfer roller 64. The toner image on the intermediate transfer belt 6 is transferred onto a sheet S by the secondary transfer roller 64. A cleaning device 68 collects toner remaining on the intermediate transfer belt 6 after the toner image is transferred onto the sheet S from the intermediate transfer belt 6.

The sheet S is fed and conveyed from a paper cassette 65 in synchronization with a timing at which the toner image on the intermediate transfer belt 6 reaches the secondary transfer nip portion T2. The sheet S can be referred to as, for example, recording paper, a recording material, a recording medium, a printing sheet, a transfer material, and transfer paper. The sheet S is separated from other sheets one by one by a separation roller 66, fed to a conveyance path, and conveyed through the conveyance path toward a registration roller pair 67. The registration roller pair 67 keeps the sheet S standby in a stopped state on the conveyance path, and is driven to feed the sheet S into the secondary transfer nip portion T2 in synchronization with the conveyance timing of the toner image on the intermediate transfer belt 6. In this way, the toner image on the intermediate transfer belt 6 is transferred onto the sheet S at the secondary transfer nip portion T2 (secondary transfer).

The sheet S with the toner image transferred thereon is conveyed to a fixing device 11 by a conveyance belt 10. The fixing device 11 applies heat and pressure to the toner image transferred on the sheet S to fix the toner image on the sheet S. After the fixing processing by the fixing device 11 is finished, the sheet S is discharged outside the image forming apparatus 100 (e.g., discharge tray).

<Control Configuration when Density Unevenness in Scanning Direction is Corrected by Exposure Amount>

Figure 2:
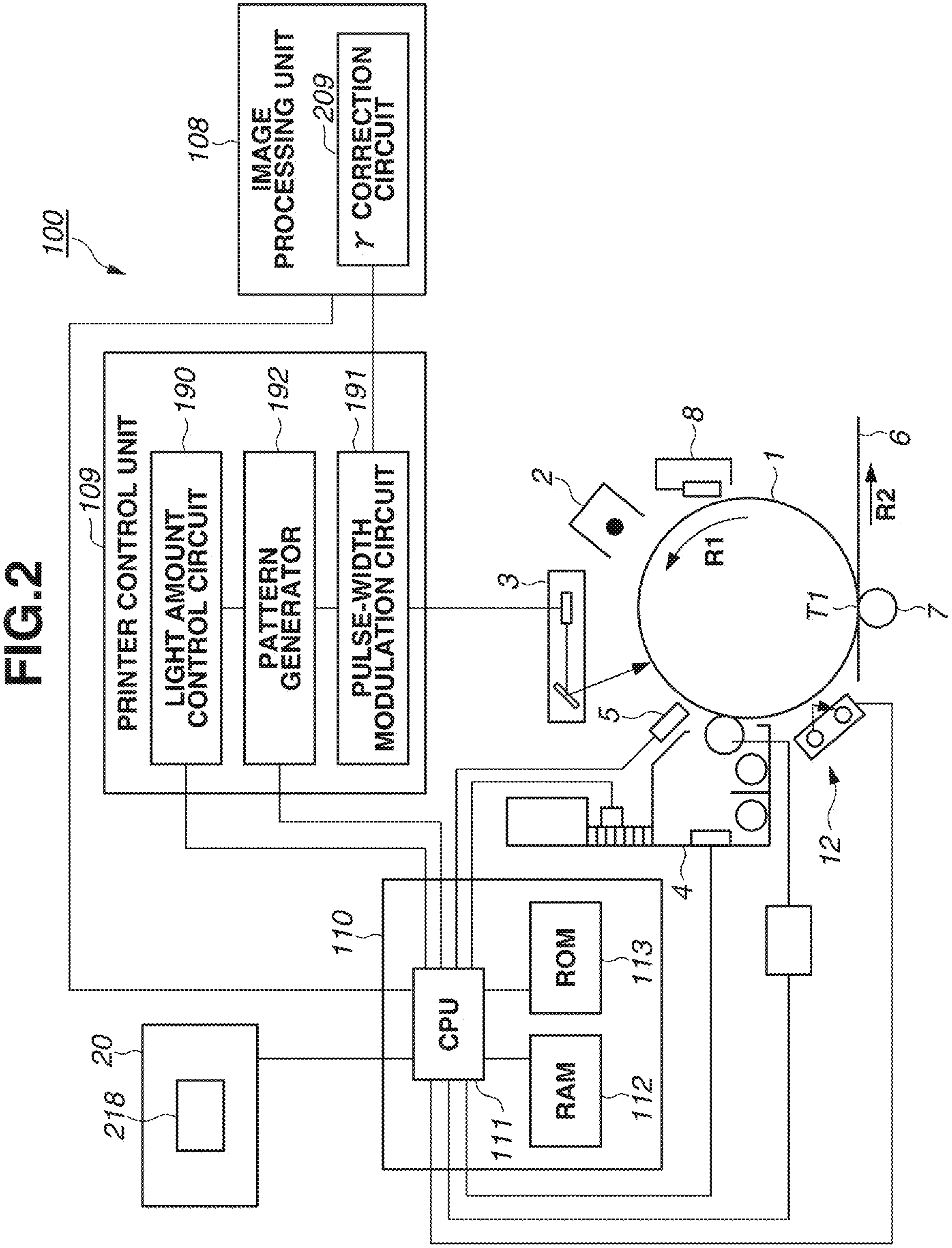
FIG. 2 is a control block diagram of the image forming apparatus.

FIG. 2 is a block diagram illustrating an example of a control configuration of the image forming apparatus 100. The printer control unit 109 includes a light amount control circuit 190, a pulse-width modulation circuit 191, and a pattern generator 192.

The image processing unit 108 includes a y correction circuit 209. In the specification, the image processing unit 108 is a component separate from the image forming unit P, but the image processing unit 108 may be a part of the image forming unit P. In this configuration, the y correction circuit 209 of the image processing unit 108 is provided in each of the image forming units P, for example.

The light amount control circuit 190 controls the light amount (power) of the laser beam output from the exposure device 3. The light amount control circuit 190 determines the light amount of the laser beam output from the exposure device 3 so that a desired image density can be obtained with respect to the laser drive signal. The light amount of the laser beam corresponds to the exposure amount by the exposure device 3, and is an example of an image forming condition. The pattern generator 192 holds image data for forming a test pattern, which is a pattern image used for density measurement described below.

The γ correction circuit 209 converts an input image signal (input values) included in the input image data into an output image signal (output values) by referring to a gradation correction table (γ LUT). The gradation correction table is a conversion table for converting the input values of the image data to correct the gradation characteristic of the image formed by the image forming unit P to an ideal gradation characteristic. The correspondence relationship between the output image signal and the density is obtained in advance and stored in the ROM 113. The gradation correction table generated based on the correspondence relationship is stored in the γ correction circuit 209.

The pulse-width modulation circuit 191 generates the laser drive signal based on the image signal that has been converted based on the gradation correction table and the light amount determined by the light amount control circuit 190 and has been output from the γ correction circuit 209. The laser drive signal is a pulse width modulation (PWM) signal, and used to modulate the laser beam output from the exposure device 3. The pulse-width modulation circuit 191 outputs, as the laser drive signal, a pulse signal with a pulse width (time width) corresponding to a density indicated by the input image signal for each pixel. The pulse width of the laser drive signal is wide for a high density pixel, narrow for a low density pixel, and middle for a middle density pixel.

The exposure device 3 forms on the photosensitive drum 1 an image (electrostatic latent image) with the gradation expressed using an area coverage modulation corresponding to the pulse width of the laser drive signal. More specifically, the laser beam source (semiconductor laser) of the exposure device 3 emits light only during a time period corresponding to the pulse width of the supplied laser drive signal. The laser beam source is driven longer as the density of the formation target pixel is higher, and driven shorter as the density of the formation target pixel is lower. Thus, a dot size (area) of the electrostatic latent image formed on the photosensitive drum 1 becomes different depending on the density of the pixel. In other words, the exposure device 3 exposes a longer range in the scanning direction for the high density pixel, and a shorter range in the scanning direction for the low density pixel. In the present exemplary embodiment, the scanning direction is orthogonal to the sheet conveyance direction. Hereinbelow, the scanning direction is described as a main scanning direction. A sub scanning direction is a sheet conveyance direction, that is, a direction orthogonal to the main scanning direction.

A density sensor 12 is provided near the photosensitive drum 1 and between the developing device 4 and the primary transfer nip portion T1. The density sensor 12 is a photosensor for detecting the density of the toner image formed on the photosensitive drum 1. The control unit 110 (CPU 111) can measure the density of the toner image formed on the photosensitive drum 1, using the density sensor 12.

In the present embodiment, the control unit 110 (CPU 111) obtains measurement data indicating a measurement result of a test pattern density and performs processing based on the measurement result, by performing the "document platen reading" or the "ADF reading" using the image reading unit 100A. The control unit 110 (CPU 111) further controls generation of the test pattern for the density unevenness correction with the printer unit 100B, as well as correction of the exposure amount of the exposure device 3 in the image formation by the printer unit 100B.

<Shading Function>

The image forming apparatus 100 corrects the density unevenness in the main scanning direction occurring in the image (output image) formed by the printer unit 100B using a shading function included in the exposure device 3. The exposure device 3 can adjust the strength (exposure amount) of the laser beam output from the laser beam source, using the shading function. The density unevenness in the main scanning direction occurring in the output image can be corrected by adjusting (correcting) the light amount of the laser beam based on the density unevenness in the main scanning direction to occur in the output image.

In the image forming apparatus 100, an image formation area in which an image is formed by scanning the laser beam in the main scanning direction is divided into a plurality of areas each with an equal length in the main scanning direction, and the light amount setting (LPW) of the exposure device 3 is determined for each divided area. For example, the image formation area is divided into 14 areas of A to N (refer to FIG. 5). The length of each area in the main scanning direction is, for example, 23.59 mm. The control unit 110 corrects the light amount setting (LPW) of each of the areas A to N in the image forming apparatus 100. The light quantity correction amount (exposure correction amount ΔLPW) of the laser beam to be used to correct the density unevenness is generated in area units (for each of areas A to N) through correction processing described below.

The above-described exposure correction amount ΔLPW is obtainable based on the γ characteristic of the image forming engine equivalent to the density characteristic indicating the correspondence relationship between a light amount setting value of the exposure device 3 and the density value of the output image. In a case where the exposure correction amount ΔLPW is determined for each area described above using the γ characteristic determined in advance to be the γ characteristic, the correction accuracy of the density unevenness may decrease with a change in the γ characteristic of the image forming engine.

Figure 3:
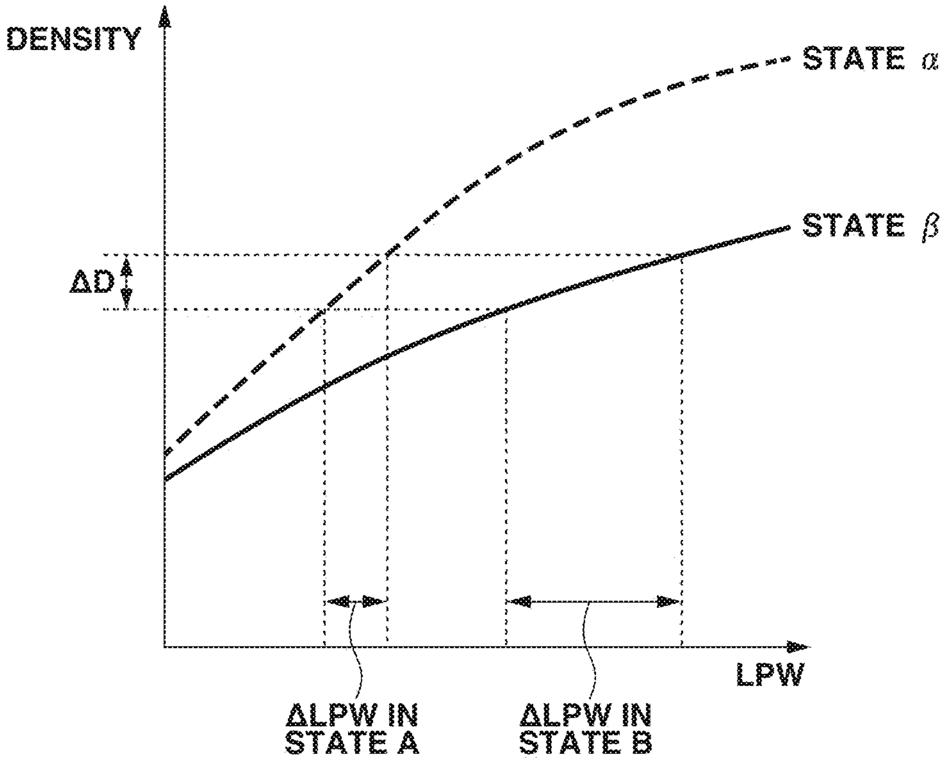
FIG. 3 is a graph illustrating a difference of γ characteristic depending on a state of the image forming apparatus.

FIG. 3 is a graph illustrating a difference in the γ characteristic depending on a state of the image forming apparatus 100.

The state of the image forming apparatus 100 includes a potential characteristic of the photosensitive drum, a toner charging characteristic, an attachment tolerance of each component, a potential of the photosensitive drum at a time of image formation, and an exposure amount of the laser beam at a time of image formation. For example, as illustrated in FIG. 3, in a case where a density difference ΔD to be corrected to correct the density unevenness in the main scanning direction is the same in a state α and in a state β that are different in γ characteristic, the exposure correction amounts ΔLPW are to be different therebetween depending on the states. However, in a case where the exposure correction amount ΔLPW corresponding to the density difference ΔD is determined using the γ characteristic determined fixedly in advance, the exposure unevenness correction accuracy decreases because the light amount setting value of the exposure device 3 cannot be controlled appropriately.

Thus, the image forming apparatus 100 initially outputs a density unevenness detection pattern, and determines a plurality of exposure correction amounts ΔLPW based on the measurement result of the pattern. The image forming apparatus 100 outputs a plurality of the patterns corresponding one-to-one to the plurality of exposure correction amounts ΔLPW, and corrects the density unevenness accurately, by selecting an appropriate exposure correction amount ΔLPW from among the plurality of patterns. In this case, the plurality of patterns (a plurality of test images) corresponding to the plurality of exposure correction amounts ΔLPW is used for determining the correction amount, and used for determination of a gain serving as a correction condition for increasing or decreasing of the correction amount of the exposure amount.

<Density Unevenness Correction Processing>

Next, a description will be provided of correction processing for correcting the density unevenness in the main scanning direction that occurs in the image (output image) formed by the printer unit 100B. This correction processing is performed by the control unit 110 of the image forming apparatus 100.

Figure 4:
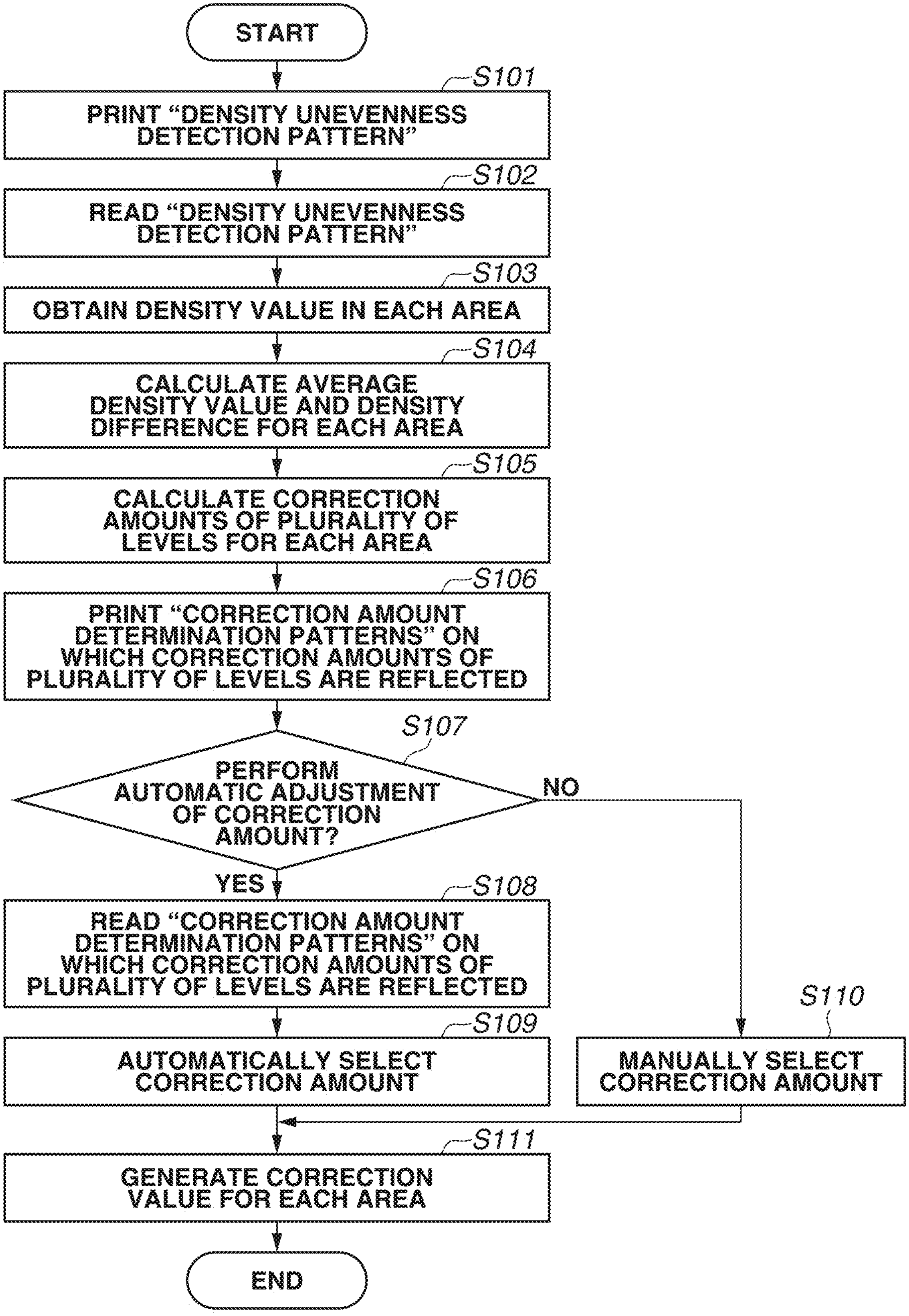
FIG. 4 is a flowchart illustrating density unevenness correction processing.

FIGS. 6A to 6F are example diagrams of operation screens for receiving an execution of the above-described correction processing. The operation screens are displayed on a display of the display unit 218 of the operation unit 200. A user can instruct the image forming apparatus 100 to execute processing linked to a button by selecting the button from among buttons displayed on the operation screen using the operation unit 200. FIG. 4 is a flowchart illustrating a procedure of the density unevenness correction processing. Hereinbelow, the density unevenness correction processing will be described according to the flowchart.

Figure 5:
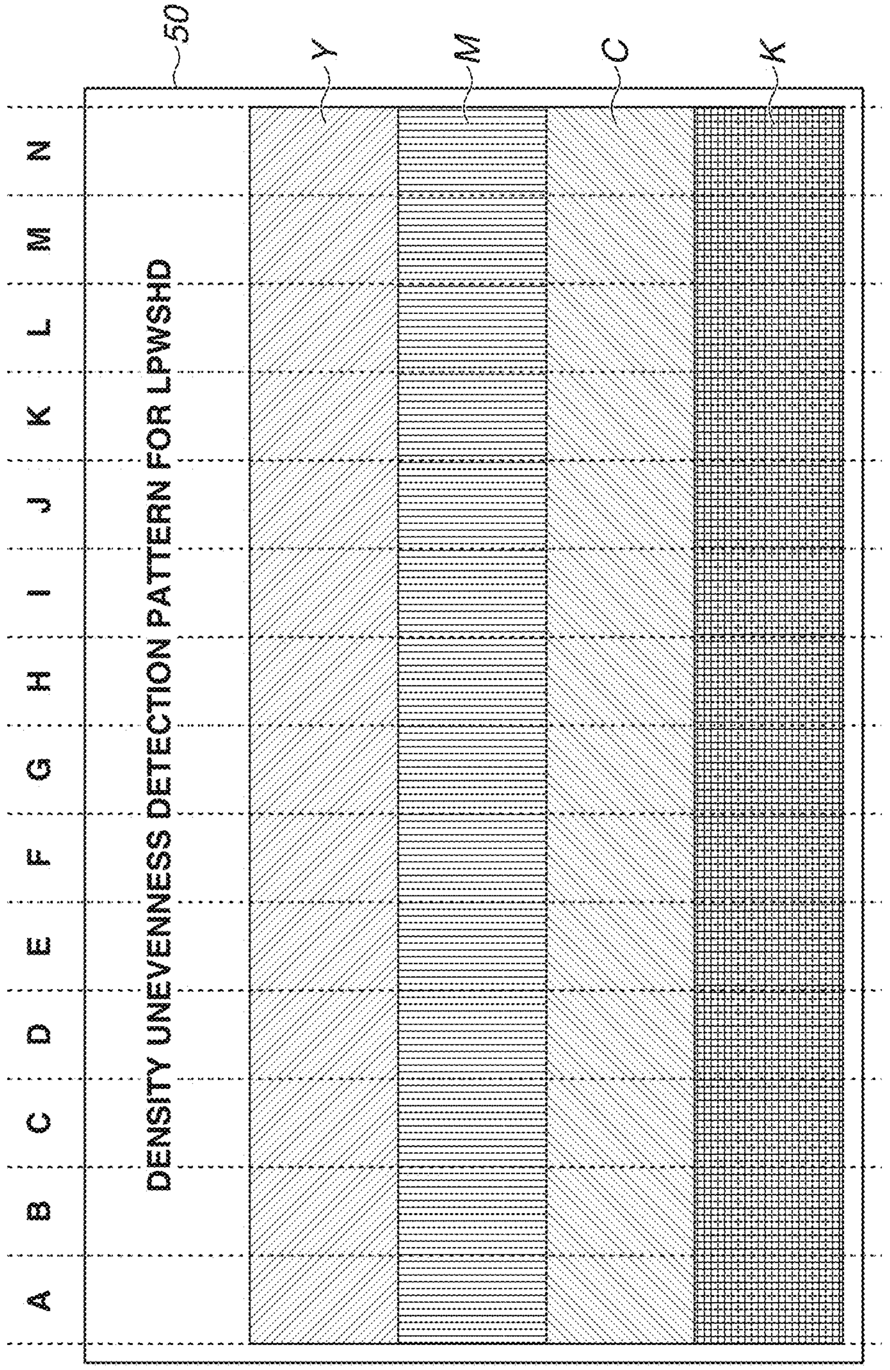
FIG. 5 is a schematic diagram of a density unevenness detection pattern.
Figure 6A:
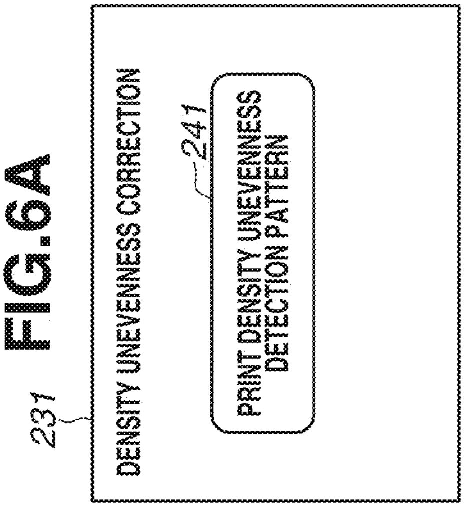
FIGS. 6A to 6F are examples of screens displayed on a display unit.

The control unit 110 initially displays a screen 231 illustrated in FIG. 6A on the display unit 218. The button 241 for instructing the printer unit 100B to print a density unevenness detection pattern 50 is displayed on the screen 231. In step S101, in response to a user pressing the button 241 on the screen 231, the control unit 110 controls the printer unit 100B to form, on the sheet S, the density unevenness detection pattern 50 including Y, M, C, and K band images illustrated in FIG. 5. In this case, the Y, M, C, and K band images serve as a detection image.

FIG. 5 is a schematic diagram of the density unevenness detection pattern 50 which is output in step S101. As illustrated in FIG. 5, the density unevenness detection pattern 50 includes a plurality of band images each with a predetermined width in the conveyance direction of the sheet S (also referred to as the sub scanning direction), and extending in the main scanning direction. The plurality of band images is formed all over the image formation area in the main scanning direction based on the uniform image signal value for each band. As the band images in the present embodiment, total four band images, one for each color, are arranged in the sub scanning direction orthogonal to the main scanning direction. Each of the band images is formed to have a uniform density if the density unevenness does not occur. The image signal for forming each of the band images is set to, for example, a value indicating 40% density level of a maximum density level. When the density unevenness detection pattern 50 is formed on the sheet S, the control unit 110 displays a screen 232 illustrated in FIG. 6B on the display unit 218. The button 242 for issuing an instruction to read the density unevenness detection pattern 50 is displayed on the screen 232.

In step S102, in response to the user placing the sheet S with the density unevenness detection pattern 50 formed thereon on the image reading unit 100A and pressing the button 242 on the screen 232, the control unit 110 controls the image reading unit 100A to read the density unevenness detection pattern 50 on the sheet S. In this way, the control unit 110 obtains a read result, read by the reading sensor 105, for the image (density unevenness detection pattern 50) on the sheet S. In this case, the user can select a reading mode to be used by the image reading unit 100A from the "document platen reading" and the "ADF reading".

Next, in step S103, the control unit 110 obtains density values in areas A to N (density data) in the main scanning direction for each of the band images in the density unevenness detection pattern 50, and stores the density values of the areas A to N of each of the band images in the main scanning direction in the RAM 112 as a density profile. The density profile is a detection result detected as information regarding the density of the density unevenness detection pattern 50. In step S103, since the signal output from the reading sensor 105 has a signal value (luminance value) corresponding to the luminance, the control unit 110 obtains the density value converted from the luminance value by the image processing unit 108.

Hereinbelow, a description is provided of a method of correcting the density unevenness of the yellow image based on the density profile of the yellow band image, from among the density profiles of the band images of four colors (Y, M, C, and K). The methods of correcting the density unevenness of the other color images from the density profiles of the band images of the other colors (M, C, and K) are similar to that for the yellow image.

In step S104, the control unit 110 calculates an average density value, which is an average value of the density values of the areas A to N based on the density profile stored in the RAM 112, and calculates a difference value (density difference AD) between the average density value and each of the density values of the areas A to N. The distribution of the density differences AD for each of the band images equates to the distribution of the density unevenness in the main scanning direction occurring in the output image. The density difference AD of each of the areas A to N equates to the density correction value in the correction processing of the density unevenness of the output image. The average density value is a target density value (target data) in the correction processing. Here, the density target value (target data) is not limited to the average density value. The density target value (target data) may be, for example, a predetermined density value.

Next, as illustrated in FIG. 7, the control unit 110 determines a plurality of exposure correction amounts ΔLPW (ΔLPW1, ΔLPW2, ΔLPW3, ΔLPW4, and ΔLPW5) from the density differences ΔD, based on a plurality of gains (Gain1, Gain2, Gain3, Gain4, and Gain5). Here, the exposure correction amounts ΔLPW each are a correction amount of the LPW to be added to the LPW at the time of image formation. In step S105, the control unit 110 determines five exposure correction amounts ΔLPW (ΔLPW1, ΔLPW2, ΔLPW3, ΔLPW4, and ΔLPW5) with respect to the density difference AD of each of the areas A to N as illustrated in FIG. 8. In step S105, the control unit 110 generates a plurality of image forming conditions for generating test images. At this time, the control unit 110 displays a screen 233, illustrated in FIG. 6C, on the display unit 218 to print correction amount determination patterns. A button 243 for instructing the printer unit 100B to print the correction amount determination patterns is displayed on the screen 233.

Figure 9A:
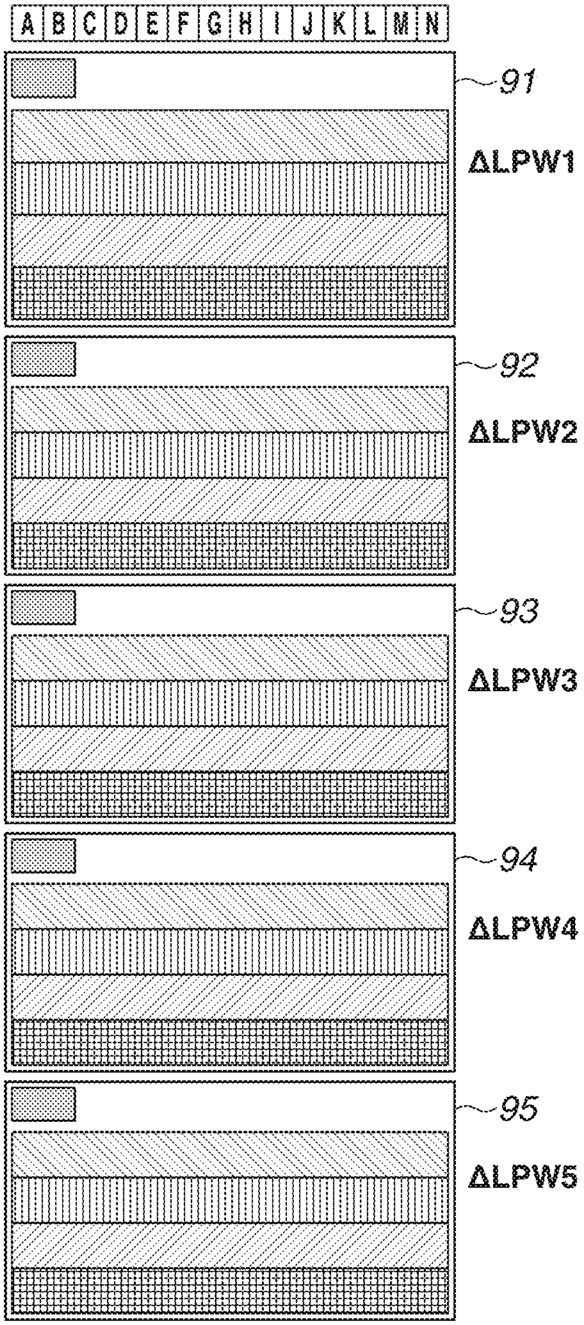
FIGS. 9A and 9B are schematic diagrams illustrating correction amount determination patterns.

In step S106, after the user presses the button 243 on the screen 233, the control unit 110 controls the printer unit 100B to print on the sheets S the correction amount determination patterns 91 to 95 illustrated in FIG. 9A, based on the exposure correction amounts ΔLPW determined in step S105. At this time, the correction amount determination patterns 91 to 95 are formed on the separate sheets S (total 5 sheets) for the respective gains as illustrated in FIG. 9A. A mark is formed on each of the correction amount determination patterns 91 to 95 to determine which gain (any one of Gain1 to Gain5) is reflected thereon.

Figure 9B:
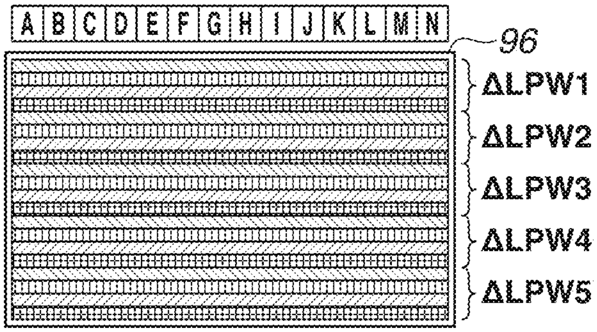

Instead of the correction amount determination patterns 91 to 95, the correction amount determination pattern 96 based on the plurality of gains, illustrated in FIG. 9B, may be formed on the single sheet S. The correction amount determination pattern 96 illustrated in FIG. 9B includes five band images corresponding to five gains for each of four colors (Y, M, C, and K).

Figure 6B:
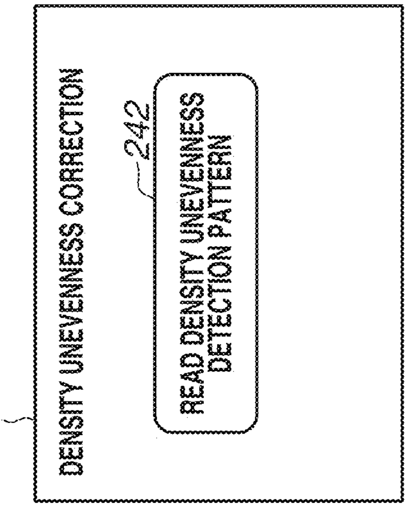
Figure 6C:
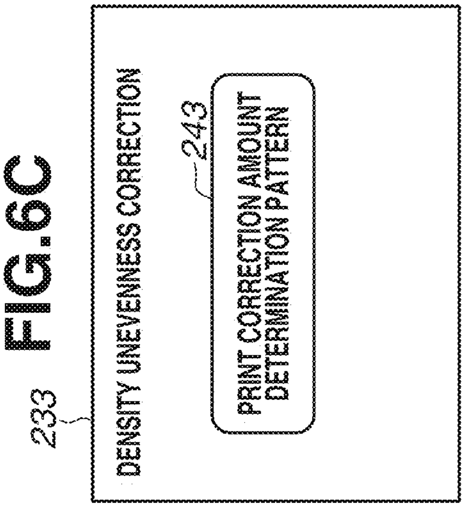
Figure 6D:
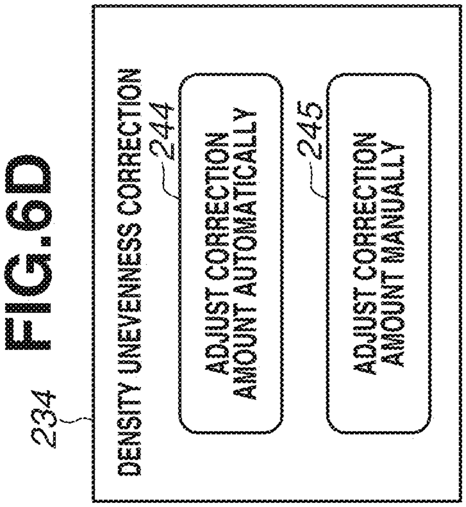
Figure 6E:
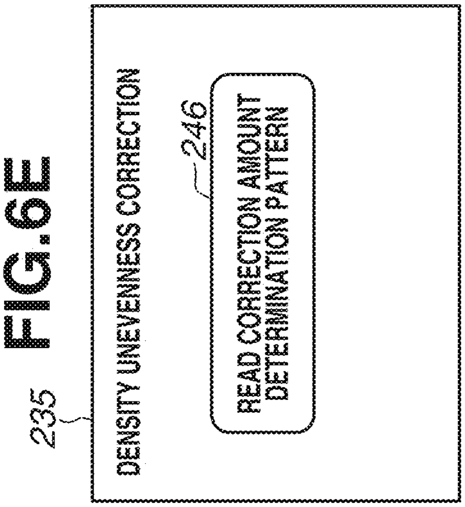
Figure 6F:
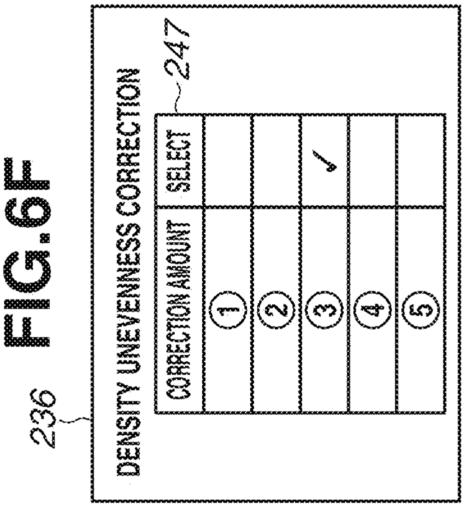

After the correction amount determination patterns 91 to 95 (or the correction amount determination pattern 96) are printed, the control unit 110 displays a screen 234 illustrated in FIG. 6D on the display unit 218. On the screen 234, a button 244 for issuing an instruction to perform an automatic adjustment of the correction amount and a button 245 for issuing an instruction to perform a manual adjustment of the correction amount are displayed to be selectable. In step S107, the control unit 110 determines an adjustment method for the exposure correction amounts ΔLPW based on which of the button 244 and the button 245 is selected by the user on the screen 234.

In step S107, if the button 244 is pressed on the screen 234 (YES in step S107), the control unit 110 determines that the automatic adjustment of the exposure correction amounts ΔLPW is selected, and the processing proceeds to step S108. In the case where automatic adjustment is selected, the control unit 110 displays a screen 235 illustrated in FIG. 6E on the display unit 218. On the screen 235, a button 246 for instructing the image reading unit 100A to read the correction amount determination patterns is displayed. In step S108, in response to the user placing, on the image reading unit 100A, the plurality of the sheets S with the correction amount determination patterns 91 to 95 formed thereon and pressing the button 244 on the screen 234, the control unit 110 controls the image reading unit 100A to read the correction amount determination patterns 91 to 95 formed on the sheets S. In this way, the control unit 110 obtains a read result, read by the reading sensor 105, of the images (correction amount determination patterns 91 to 95) on the sheets S. Similarly, in a case where the correction amount determination pattern 96 is used, in response to the user placing, on the image reading unit 100A, the sheet S with the correction amount determination pattern 96 formed thereon and pressing the button 244 on the screen 234, the control unit 110 controls the image reading unit 100A to read the correction amount determination pattern 96 formed on the sheet S.

Here, the user may select the "document platen reading" or the "ADF reading" to read by the image reading unit 100A the sheets S with the correction amount determination patterns 91 to 95 (or the correction amount determination pattern 96) formed thereon. In a case where the "document platen reading" is selected by the user, the image reading unit 100A reads the correction amount determination patterns 91 to 95 (or the correction amount determination pattern 96) formed on the sheets S placed on the document platen glass 102. In a case where the "ADF reading" is selected by the user, the image reading unit 100A reads the correction amount determination patterns 91 to 95 (or the correction amount determination pattern 96) formed on the sheets S while feeding the sheets S, placed on the tray of the ADF 220, one by one. Thus, in the case where the correction amount determination patterns 91 to 95 are formed on the plurality of separate sheets S, the "ADF reading" is suitable.

Figure 10A:
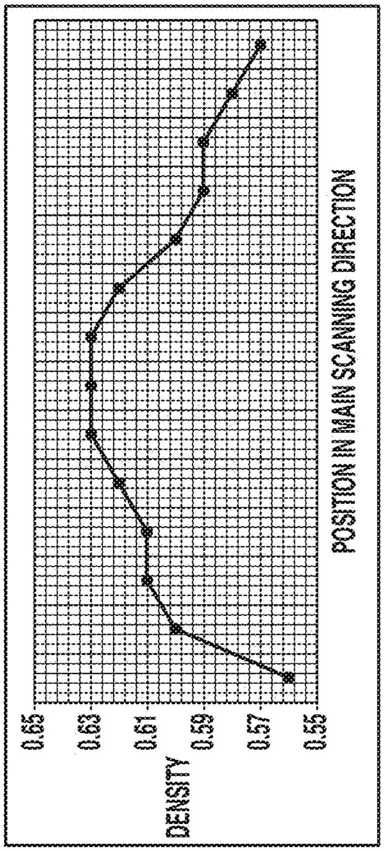
FIGS. 10A to 10D are graphs each illustrating an effect of the density unevenness correction processing.
Figure 10B:
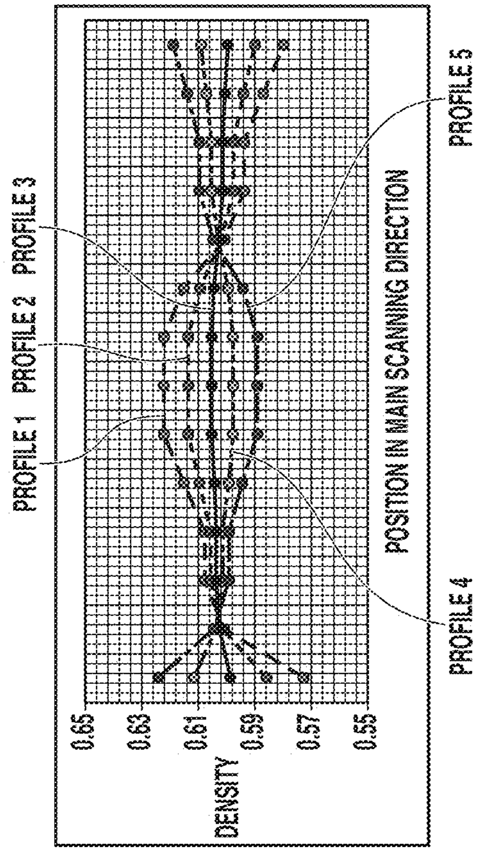

FIG. 10A illustrates a density profile obtained from the density values of the respective areas A to N obtained in step S103. FIG. 10B illustrates density profiles of the correction amount determination patterns 91 to 95 (or the correction amount determination pattern 96) obtained in step S108. In FIG. 10B, a profile 1 is a density profile (density profile after correction) of the correction amount determination pattern 91 that has been formed based on the exposure correction amounts ΔLPW1 determined based on the density profile before correction, and the Gain1. In FIG. 10B, a profile 2 is a density profile (density profile after correction) of the pattern 92 that has been formed based on the exposure correction amounts ΔLPW2 determined based on the density profile before correction, and the Gain2. In FIG. 10B, a profile 3 is a density profile (density profile after correction) of the correction amount determination pattern 93 that has been formed based on the exposure correction amounts ΔLPW3 determined based on the density profile before correction, and the Gain3. In FIG. 10B, a profile 4 is a density profile (density profile after correction) of the correction amount determination pattern 94 that has been formed based on the exposure correction amounts ΔLPW4 determined based on the density profile before correction, and the Gain4. In FIG. 10B, a profile 5 is a density profile (density profile after correction) of the correction amount determination pattern 95 that has been formed based on the exposure correction amounts ΔLPW5 determined based on the density profile before correction, and the Gain5. In the case where the correction amount determination pattern 96 is formed, profiles (profiles 1 to 5) is creatable from the read result of the correction amount determination pattern 96.

In step S109, the control unit 110 determines a profile with the smallest difference between a maximum density and a minimum density from the plurality of density profiles after correction (profiles 1 to 5). In step S111, the control unit 110 determines the exposure correction amount ΔLPW that has been used to generate the profile. For example, in FIG. 10B, the exposure correction amounts ΔLPW1 and ΔLPW2 are not sufficient in correction amount as compared with the exposure correction amount ΔLPW3. Thus, the difference in each of the profiles 1 and 2 between the maximum density and the minimum density is smaller than the difference in the profile 3 between the maximum density and the minimum density. For another example, in FIG. 10B, the exposure correction amounts ΔLPW4 and ΔLPW5 are excessively large in correction amount compared with the exposure correction amount ΔLPW3. Accordingly, the difference in each of the profiles 4 and 5 between the maximum density and the minimum density is smaller than the difference in the profile 3 between the maximum density and the minimum density. Thus, the exposure correction amount ΔLPW3 is the optimum correction amount in the exposure correction amounts ΔLPW1 to ΔLPW5.

Next, a case where the manual adjustment is selected in step S107 will be described. In a case where the button 245 is pressed on the screen 234, the control unit 110 determines that the manual adjustment of exposure correction amount ΔLPW is selected. If the manual adjustment is selected (NO in step S107), the processing proceeds to step S110. In step S110, the control unit 110 displays a screen 236 illustrated in FIG. 6F on the display unit 218. On the screen 236, a check box 247 for the user to select exposure correction amount ΔLPW with the least density unevenness is displayed. The user visually compares the correction amount determination patterns 91 to 95 (or the correction amount determination pattern 96), and selects a pattern with the least density unevenness based on the comparison result, using the check box 247. After a check mark is input in the check box 247, the control unit 110 advances the processing to step S111, and determines the exposure correction amount ΔLPW based on the user instruction information about the comparison result input by the user using the check box 247.

After determining the exposure correction amount ΔLPW in step S111, the control unit 110 ends the processing of the flowchart in FIG. 4. Then, when the printer unit 100B forms the image (output image), the light amount control circuit 190 controls the exposure amount of the exposure device 3 serving as the image forming condition, based on the exposure correction amount ΔLPW for each of the areas A to N determined in step S111. In this way, the density unevenness of the output image in the main scanning direction is appropriately corrected.

<Effect of Density Unevenness Correction>

Using the image forming apparatus 100 in a plurality of different states X and Y, an effect of correction of the exposure unevenness in the main scanning direction which occurs in the output image, in a case where the correction processing described above is applied to the image forming apparatus 100 in the state X or Y, will be described.

Figure 10C:
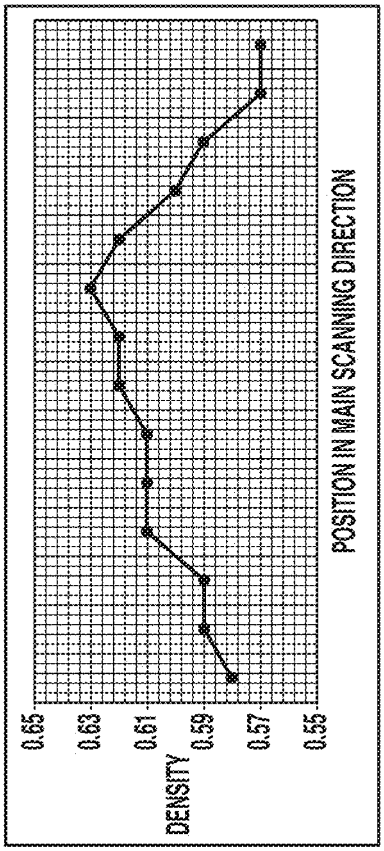
Figure 10D:
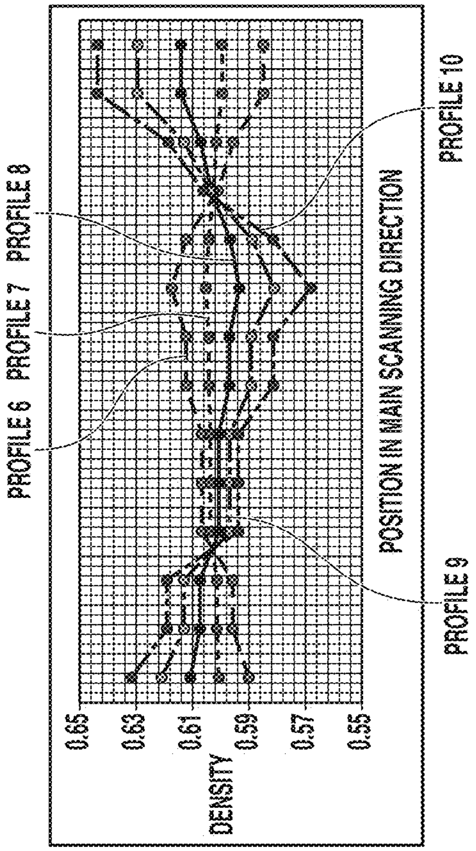

FIG. 10C illustrates a density profile (before correction) of an image formed by the image forming apparatus 100 in the state Y different from the state X in FIG. 10A. FIG. 10D illustrates density profiles (after correction) of the correction amount determination patterns 91 to 95 (or the correction amount determination pattern 96) formed based on the density profile in FIG. 10C. In the state Y, for example, abrasion loss of the photosensitive drum 1 is different or the charge amount of the toner is different from those in the state X. Thus, the gradation characteristic (also referred to as a density characteristic) of an image formed by the image forming apparatus 100 in the state Y is different from the gradation characteristic (density characteristic) of an image formed by the image forming apparatus 100 in the state X. Thus, the density change amount with respect to the exposure correction amount ΔLPW is different. For this reason, a fixed value of the gain value determined in advance cannot correct the exposure correction amount ΔLPW in each of the states X and Y with just the right amount, and the density unevenness in the main scanning direction cannot be corrected with a high degree of accuracy.

According to the correction processing in the present embodiment, the optimum correction amount is selected using the correction amount determination patterns 91 to 95 (or the correction amount determination pattern 96). Thus, the exposure correction amount ΔLPW3 is selected in the state X, and the exposure correction amount ΔLPW2 is selected in the state Y, for example. This enables appropriate control of the density unevenness in the main scanning direction in any of the states X and Y in the correction processing.

A second embodiment of the present disclosure will be described below. The image forming apparatus 100 according to the first embodiment executes a main scanning shading (referred to as LPWSHD) to correct the density unevenness by changing the laser power irradiating a plurality of areas on the photosensitive drum 1 in the main scanning direction. The main scanning shading that corrects the density unevenness in the main scanning direction includes, in addition to the LPWSHD, a method of correcting the density unevenness in the main scanning direction by creating look-up tables (LUTs) corresponding one-to-one to the plurality of areas on the photosensitive drum 1 (such a method is referred to as look-up table shading [LUTSHD]). The LUTSHD can correct the density unevenness with different gradation levels highly accurately compared with the LPWSHD. Hereinbelow, the image forming apparatus 100 that executes the LUTSHD as correction processing will be described. In addition, components similar to those of the first embodiment are assigned the same numbers and the detailed descriptions thereof are omitted.

<Control Configuration of Image Forming Apparatus Executing LUTSHD>

Figure 11A:
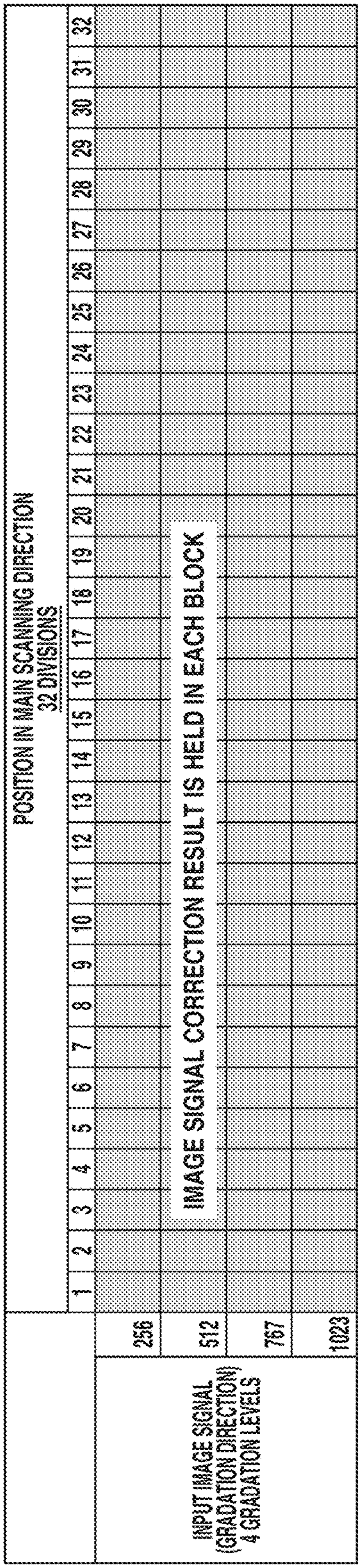
FIGS. 11A to 11C are diagrams each illustrating a look-up table (LUT) at each position in a main scanning direction.
Figure 11B:
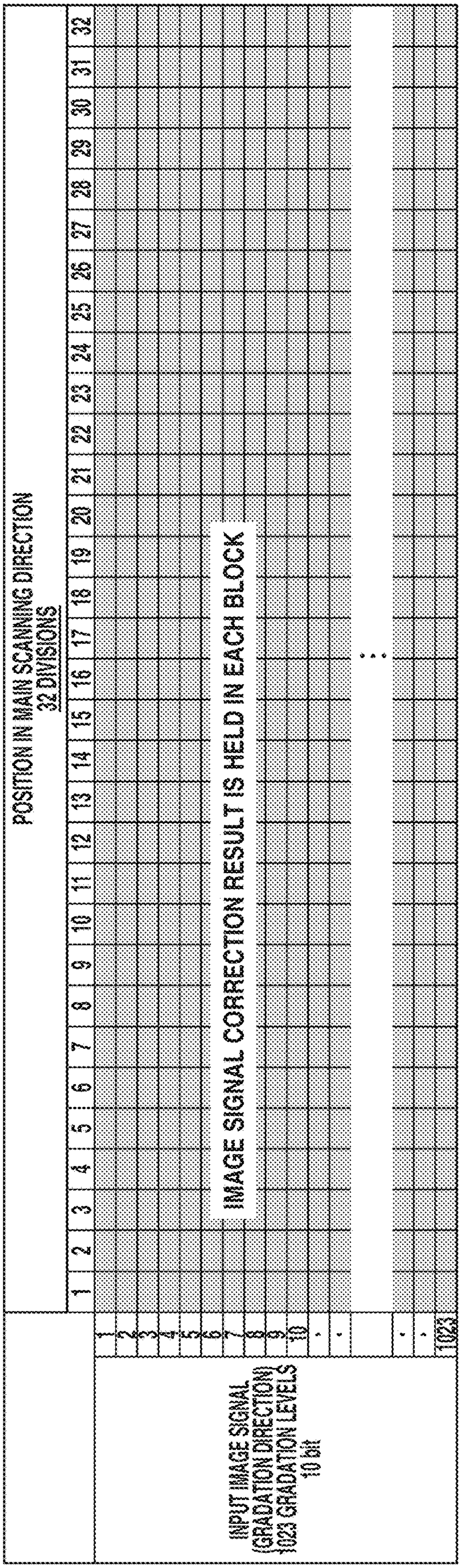
Figure 11C:
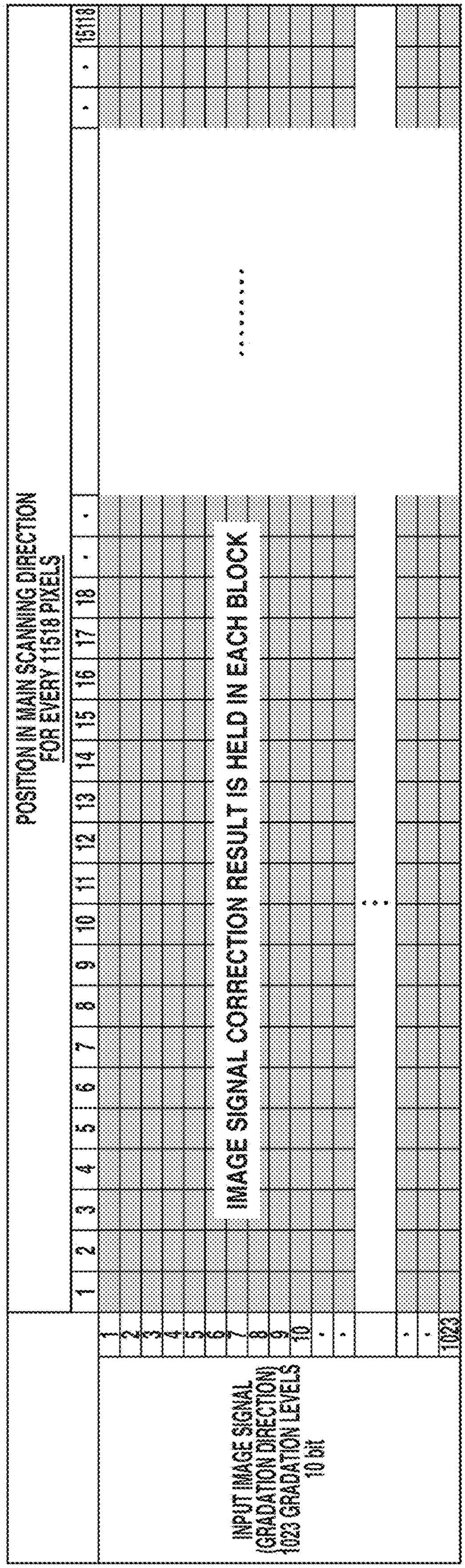

The control unit 110 converts the image data to correct the density unevenness in the main scanning direction of the image to be formed. In order to correct the density unevenness in the main scanning direction, the control unit 110 converts the image data based on a plurality of LUTs corresponding one-to-one to a plurality of positions in the main scanning direction (main scanning positions). Each of the LUTs is a one-dimensional table indicating a correspondence relationship between the input image signal (image signal value before conversion) and the output image signal (image signal value after conversion). FIGS. 11A, 11B, and 11C are diagrams each illustrating LUTs corresponding to respective positions in the main scanning direction.

FIG. 11A illustrates LUTs (image signal value correction table) each illustrating a correspondence relationship between the input image signal (image signal value before conversion) and the output image signal (image signal value after conversion) at each main scanning position in a case where an entire main scanning range is divided into 32 positions. The image signal value correction table is created based on a read result of the density unevenness detection pattern for the LUTSHD to be described below. In the density unevenness detection pattern for the LUTSHD, 4-gradation test image is formed in the sub scanning direction orthogonal to the main scanning direction. The image signal value correction table includes a correction table for each area obtained by dividing the area into 32 areas in the main scanning direction.

FIG. 11B illustrates a result of linear interpolation performed on the image signal value correction table illustrated in FIG. 11A.

Figure 12:
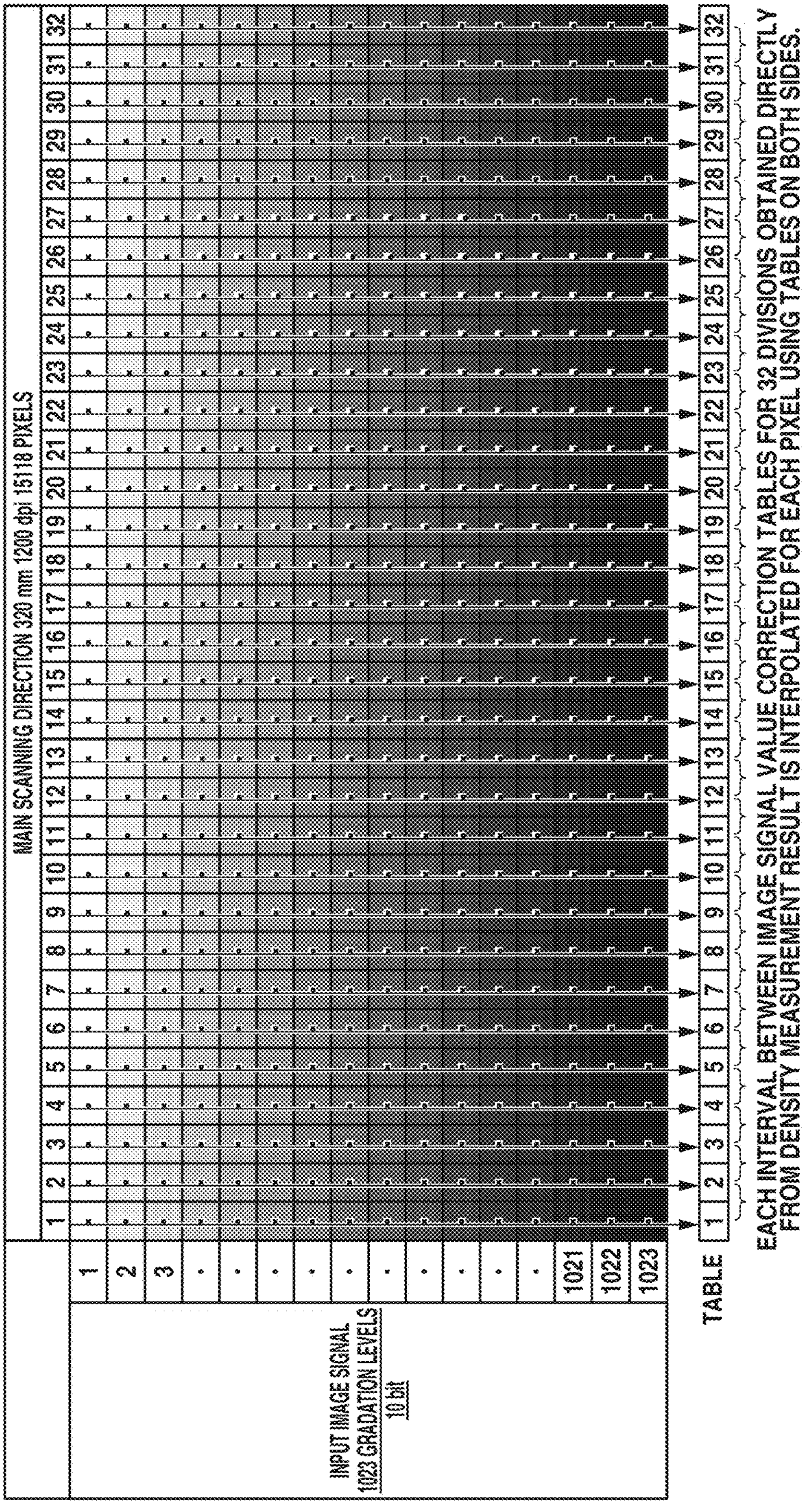
FIG. 12 is a diagram illustrating a correction amount interpolation method for each pixel.

FIG. 11C illustrates LUTs corresponding one-to-one to the plurality of areas in the main scanning direction generated by performing linear interpolation on the intervals between the 32 divisions of the image signal value correction table in the main scanning direction after the linear interpolation is performed as illustrated in FIG. 11B. This image signal value correction table is generated for each position in the main scanning direction. Further, these image signal value correction tables are generated for each color. For example, in a case where the image length in the main scanning direction that is formable by the image forming apparatus 100 is 320 mm, the number of pixels is 15,118 with the resolution of 1200 dpi. In the case where the input image signal is divided into 32 areas in the main scanning direction, the interval of the center positions of the adjacent areas is 472 pixels. At the center position of each area at which the image density of the density unevenness detection pattern 51 is measured, the correction amount of the image signal created based on the measurement result of the image density is used without change, and at the other main scanning positions, the correction amounts of image signals of the adjacent areas on both sides are interpolated and used. FIG. 12 is a diagram illustrating interpolation of a correction amount for each pixel. The density unevenness correction is achieved by using LUTs corresponding one-to-one to the plurality of areas in the main scanning direction illustrated in FIG. 11C.

The density unevenness detection pattern for the LUTSHD has a limited number of gradation levels, so that if the correction is performed using the measurement result, the continuousness of the density and the continuousness of the gradation may be lost in the undetected gradation. As a result, there is a possibility that the pseudo contour occurs in the formed image.

To prevent or reduce the occurrence of the pseudo contour, the correction result needs to be controlled using the correction reflection ratio serving as a correction condition. The correction reflection ratio is a coefficient expressing a ratio to be reflected on the correction amount from the measurement result of the image density. If the correction reflection ratio is 100% (coefficient is 1), the image signal value after conversion is determined so that the difference between the density of the read result and the ideal density is "0". If the correction reflection ratio is 80%, the image signal value after conversion is determined so that 80% (coefficient is 0.8) of the difference between the density of the read result and the ideal density is corrected. The correction reflection ratio is stored, for example, in the ROM 113, and used when the image density is measured.

Thus, lowering the correction reflection ratio controls the occurrence of pseudo contour. However, the effect of correcting the density unevenness decreases with the lowered correction reflection ratio. Thus, the image forming apparatus 100 forms a density unevenness detection pattern for the LUTSHD, and calculates, based on the measurement result of the pattern, LUTs corresponding to each of the plurality of areas in the main scanning direction for every plurality of correction reflection ratios. The correction accuracy of the density unevenness is improved while controlling the occurrence of the pseudo contour, by outputting the correction amount determination pattern on which the LUTs corresponding to the plurality of areas in the main scanning direction are reflected, and selecting appropriate LUTs corresponding to the plurality of areas in the main scanning direction.

<Density Unevenness Correction Processing by Image Data Conversion>

Next, a description will be provided of correction processing for correcting the density unevenness in the main scanning direction which occurs in the image (output image) formed by the printer unit 100B. This correction processing is performed by the control unit 110 of the image forming apparatus 100. In the LUTSHD, the density unevenness detection pattern 51 is formed on the sheet S as the density unevenness detection pattern.

Figure 13:
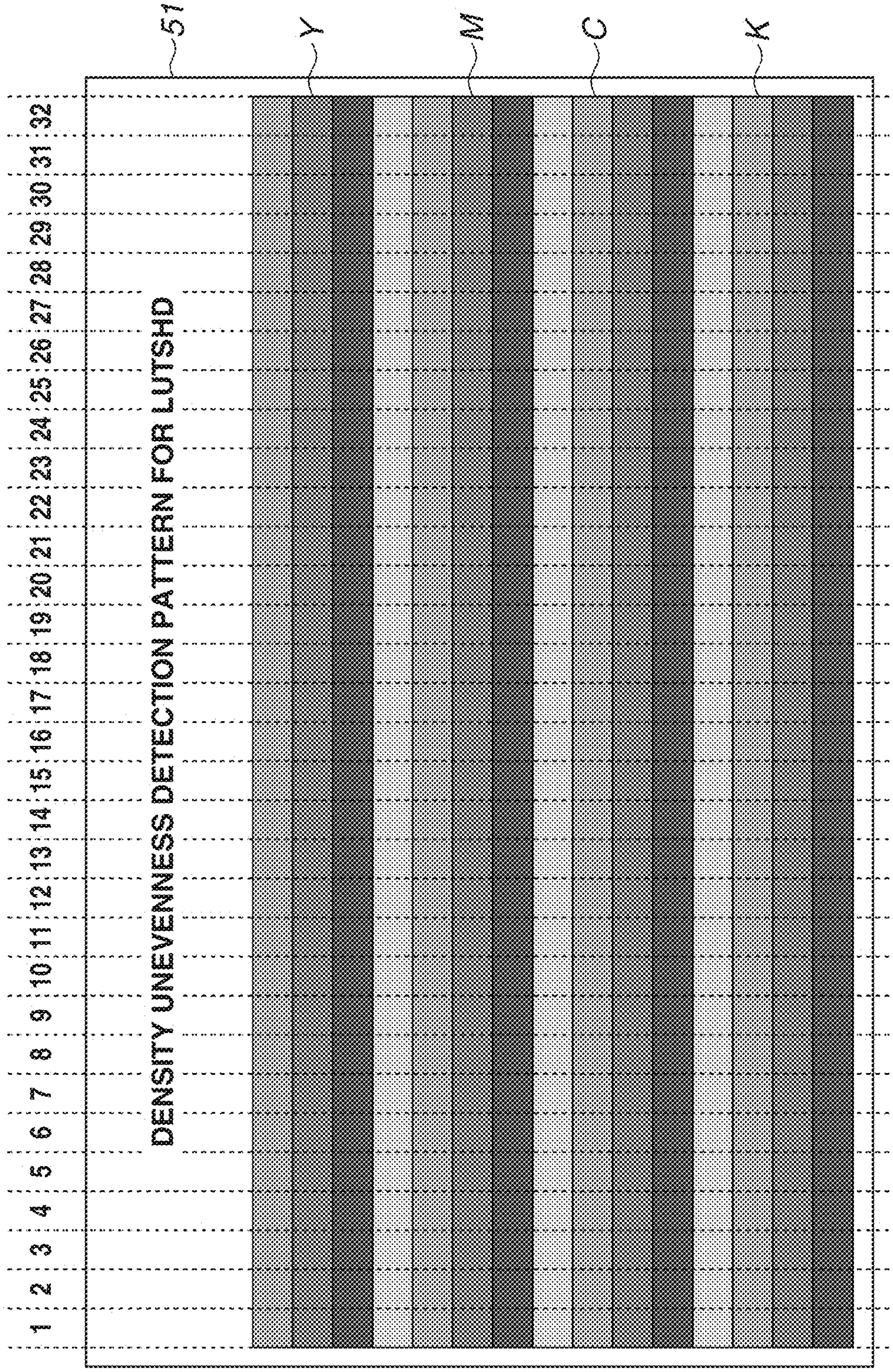
FIG. 13 is a schematic diagram of another density unevenness detection pattern.

FIG. 13 is a schematic diagram of the density unevenness detection pattern 51 for the LUTSHD. The density unevenness detection pattern 51 includes images each having a predetermined width in the sub scanning direction and extending in the main scanning direction (band images). The band images are formed all over the image formation area in the main scanning direction based on the uniform image signal value for each band. Each of the band images is formed to have a uniform density if the density unevenness does not occur. The image signal for forming each of the band images has, for example, a value indicating a density level of 25%, 50%, 75%, or 100% of the maximum density level. When the density unevenness detection pattern 51 is formed on the sheet S, the control unit 110 displays the screen 232 as illustrated in FIG. 6B on the display unit 218. The button 242 for issuing an instruction to read the density unevenness detection pattern 50 is displayed on the screen 232.

Figure 14:
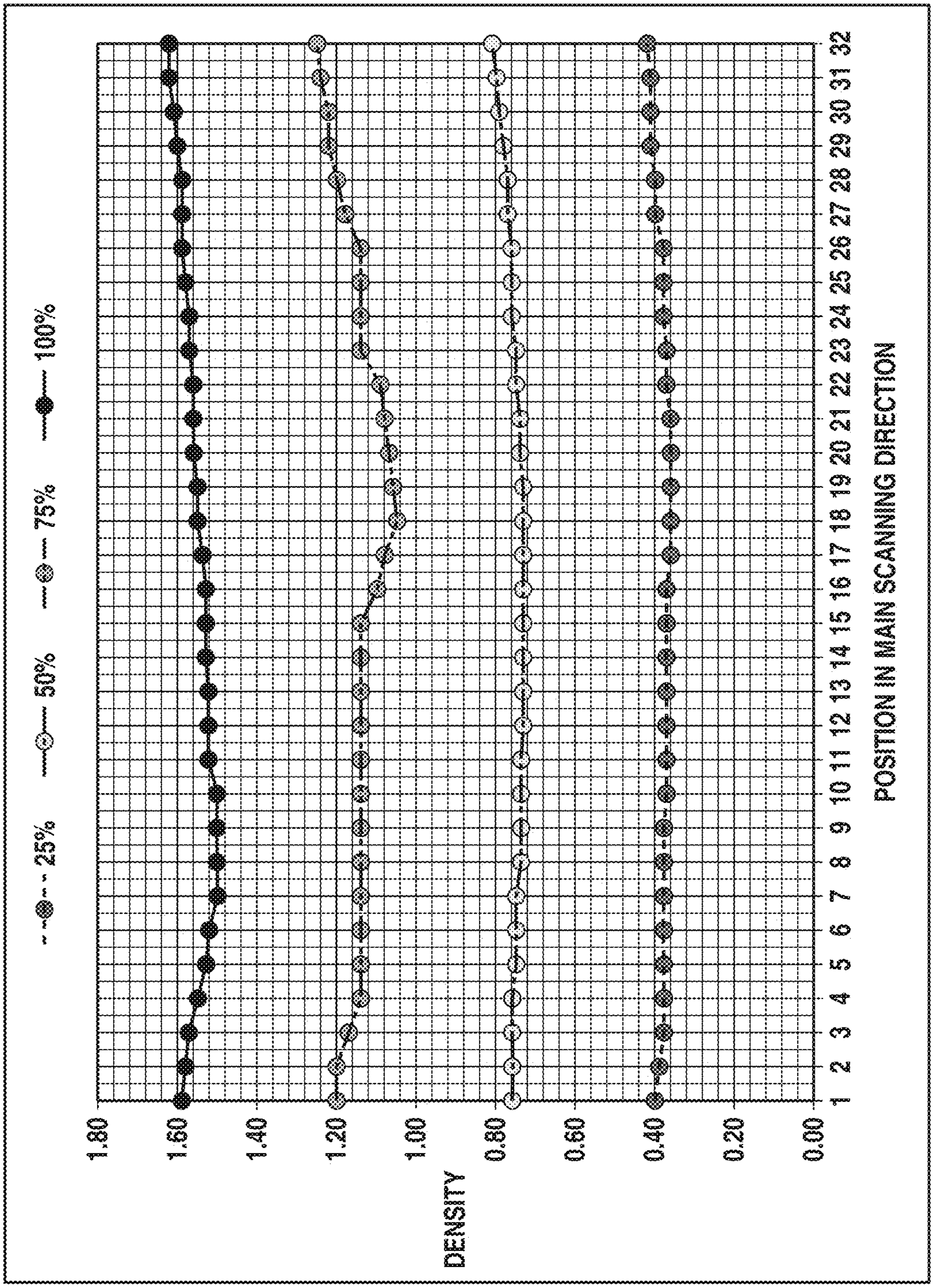
FIG. 14 is an example diagram of density profiles.

The control unit 110 stores in the RAM 112 density values obtained from the density values in the areas 1 to 32 (FIG. 13) for each of the band images, as a density profile. The density profile is a detection result detected as information about the density levels of the density unevenness detection pattern 51. Hereinbelow, a description will be provided of processing of a color (Y) among the pieces of processing of four colors (Y, M, C, and K), and the processing of other colors is performed in a similar manner. FIG. 14 illustrates an example of density profiles obtained from the density unevenness detection pattern 51 before correction.

The control unit 110 determines an average density value that is an average value of the density values in the areas 1 to 32, and a density difference AD that is a difference between the average density value and each of the density values in the areas, based on the density profiles stored in the RAM 112. The distribution of the density differences AD with respect to the average density value in the main scanning direction for each of the band images equivalents to the density unevenness in the main scanning direction occurring in the output image. The density difference AD for each of the areas 1 to 32 equivalents to the density correction amount in the correction processing of the density unevenness of the output image, and the average density value equivalents to the density target value (target data) in the correction processing. The density target value (target data) is not limited to the average density value. The density target value (target data) may be, for example, a predetermined density. FIG. 15 is an example of a table illustrating calculated density differences. The calculated density differences are the density unevenness in the main scanning direction. This density unevenness is a correction target (correction required amount).

Figure 16A:
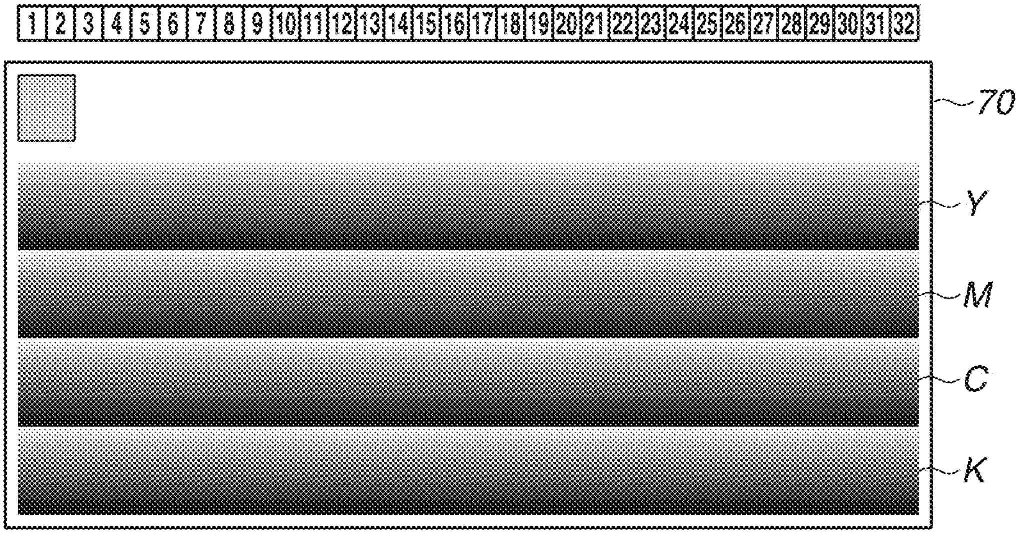
FIGS. 16A and 16B are schematic diagrams illustrating other correction amount determination patterns.
Figure 16B:
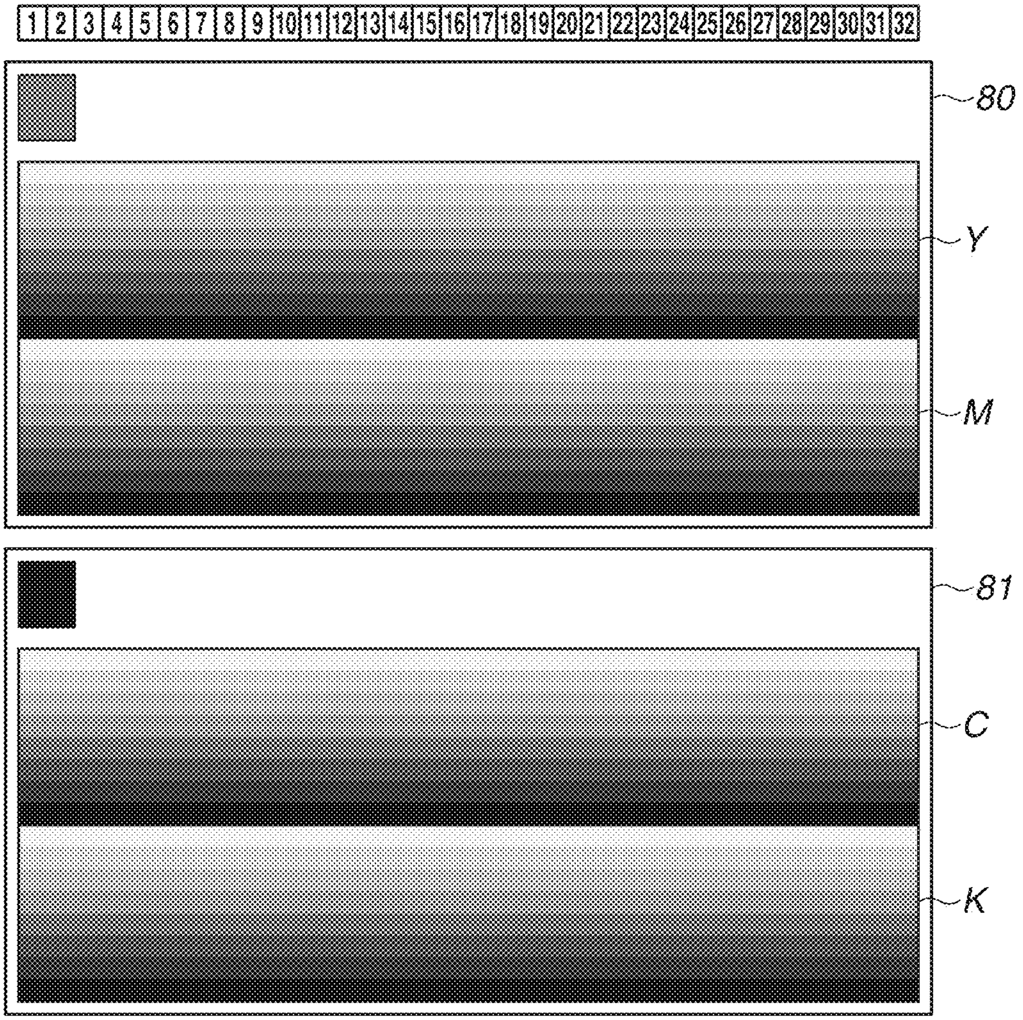

The control unit 110 generates LUTs corresponding one-to-one to the plurality of areas in the main scanning direction based on the density profile and a plurality of correction reflection ratios (60%, 70%, 80%, 90%, and 100%). The correction amount determination pattern is formed on the plurality of sheets S based on the LUTs corresponding one-to-one to the plurality of areas in the main scanning direction. FIGS. 16A and 16B illustrate examples of the correction amount determination patterns (test images) for the LUTSHD. The correction amount determination pattern 70 illustrated in FIG. 16A includes a gradation pattern of each color, and correction amount determination pattern 70 with the different correction reflection ratios from each other is output separately on the separate sheets S. Marks are formed on each of the sheets S. Each of the marks is used for discriminating which of the LUTs is reflected on the correction amount determination pattern 70 formed on the sheet S. The correction amount determination patterns 80 and 81 for the LUTSHD illustrated in FIG. 16B includes an eight-gradation band pattern of each color, and formed with the correction reflection ratios of one correction amount reflected on the two sheets S. Thus, the pattern is made of total ten sheets S including the LUTs corresponding to the plurality of areas in the main scanning direction for five reflection ratios each reflected on the two sheets S. Since the number of gradation levels of the correction amount determination pattern 70 is larger than the number of gradation levels of the density unevenness detection pattern 51 for the LUTSHD, the user can visually check whether the pseudo contour has occurred after the density unevenness correction. On each pattern, a mark is formed to determine which of the LUTs corresponding one-to-one to the plurality of areas in the main scanning direction is reflected on the pattern. The gradation pattern is easier than the uniform density pattern for the user to determine visually whether the pseudo contour has occurred. Since the area with the same signal value is wider in the uniform density pattern than in the gradation pattern, it is possible to accurately calculate the density profile in each gradation from the read result of the uniform pattern. However, the gradation pattern may be used for the automatic adjustment, or the user may visually correct the gradation pattern using the uniform density pattern.

Figure 17:
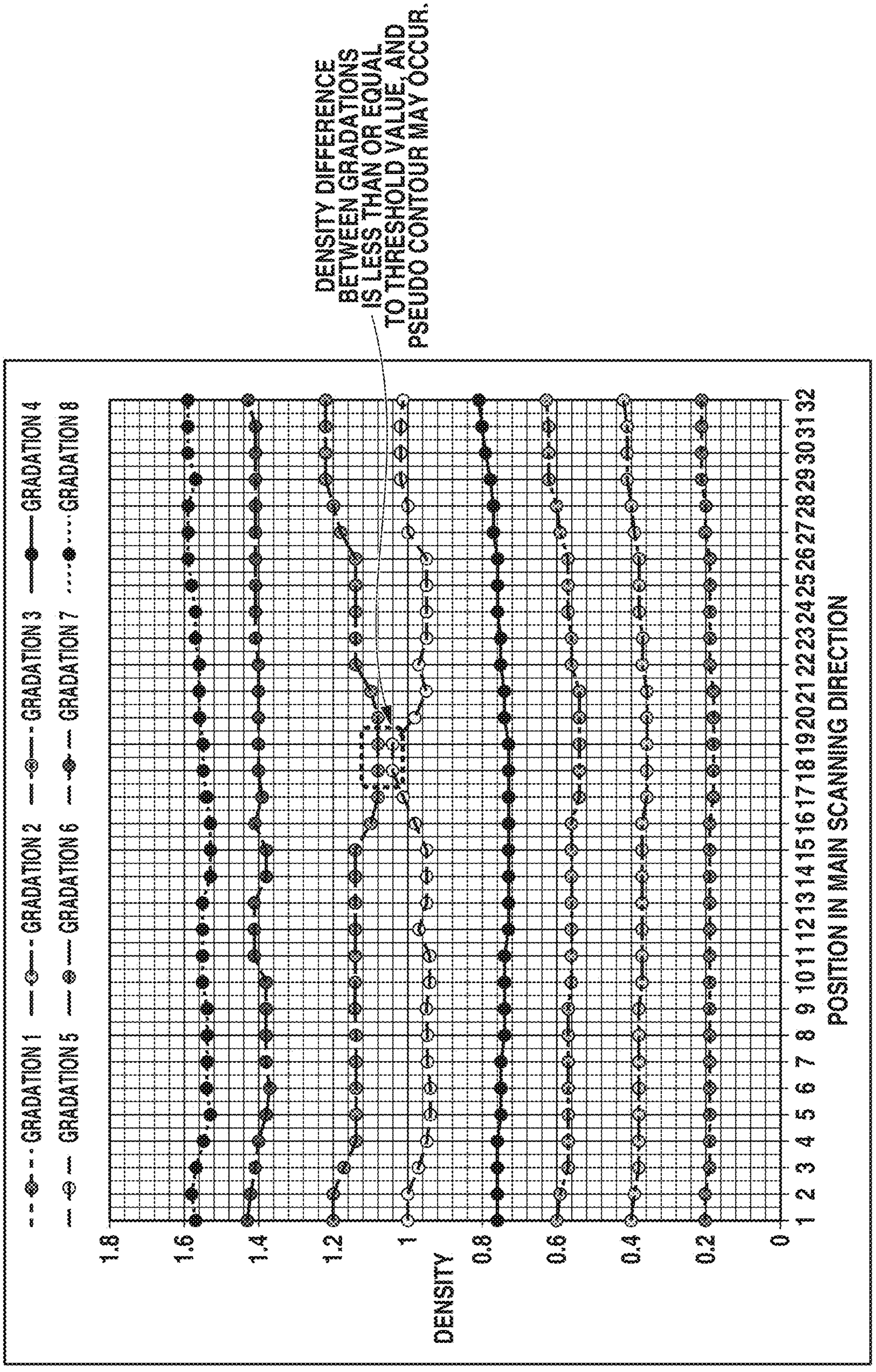
FIG. 17 is a diagram illustrating an example of density profiles with which a pseudo contour may occur.

The control unit 110 generates a density profile based on each of the correction reflection ratios of the LUTSHD. The control unit 110 determines whether the pseudo contour has occurred for the density profile for each of the generated correction reflection ratios. FIG. 17 illustrates examples of the density profiles that may cause the pseudo contour. In an area surround by a dotted line, the density differences between the gradation 5 and the gradation 6 are less than or equal to a threshold value (0.05 in the present embodiment), and the pseudo contour may occur. Thus, the control unit 110 selects a density profile with the highest correction reflection ratio as the correction reflection ratio for the LUTSHD from among the density profiles with the lower correction reflection ratios than that for the LUTSHD. In this way, it is possible to control the occurrence of the pseudo contour and to determine the correction reflection ratio at which the density unevenness in the main scanning direction is accurately corrected.

<Effect of Density Unevenness Correction through Image Data Conversion>

Next, using the image forming apparatus 100 in different states a and B, a description will be provided of a correction effect obtained by increasing the correction accuracy of the density unevenness while controlling the occurrence of the pseudo contour, in a case where the correction processing for the LUTSHD is applied to the image forming apparatus 100 in each state.

FIG. 18 illustrates an example of correction reflection ratios and whether the pseudo contour occurs with the correction amount determination pattern 70 for the LUTSHD for each of the reflection ratios in the states α and β. Compared with the state β, in the state α is, for example, an abrasion loss of the photosensitive drum 1 is different or the toner charge amount of the photosensitive drum 1 is different. In other words, the gradation characteristic (density characteristic) of the image forming apparatus 100 in the state α is different from the gradation characteristic (density characteristic) of the image forming apparatus 100 in the state β. Thus, the correction reflection ratio is to be set to 70% with the correction reflection ratio determined in advance to control the occurrence of the pseudo contour in both of the states α and β. However, although further correction is possible in the state β, correction cannot be performed.

In contrast, the correction amount with a higher correction reflection ratio is selectable while controlling the occurrence of the pseudo contour, in the correction processing for the image forming apparatus 100 in each state. More specifically, 70% is selectable as the correction reflection ratio in the state α, and 90% can be selected as the correction reflection ratio in the state β. In this way, in the correction processing, each of the density values in the density profile after correction is correctable to a value close to the average density value in each of the states α and β while controlling the occurrence of the pseudo contour.

The density profiles in the first and second embodiments have been described to be values converted from the luminance values of the pattern into the density levels. However, a luminance profile may be used instead of the density profile.

According to the present disclosure, the test image in which the density unevenness in the main scanning direction is corrected in different levels is printable. Thus, it is possible to control the occurrence of a new density unevenness caused by the correction amount of the density unevenness excessively increasing. It is also possible to control the occurrence of a situation in which the density unevenness is not sufficiently reduced because of the insufficient correction amount of the density unevenness. It is yet also possible to save the user from having to repeat many times the control of correcting the density unevenness caused by the excessive correction amount or insufficient correction amount being set.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An image forming apparatus comprising:
an image forming unit configured to form an image;
a reader configured to read a detection image used for detecting density unevenness of an image to be formed by the image forming unit, the detection image being formed by the image forming unit; and
a controller configured to:
detect the density unevenness based on a reading result of the detection image read by the reader,
control, based on different image forming conditions in which the density unevenness is suppressed, the image forming unit to form a plurality of test images,
obtain selection information indicating a test image selected from among the plurality of test images, and
suppress the density unevenness of an image to be formed by the image forming unit based on the selection information.

2. The image forming apparatus according to claim 1,
wherein the image forming unit includes:
a photosensitive member;
a light source configured to expose the photosensitive member with light to form an electrostatic latent image; and
a developing roller configured to develop the electrostatic latent image on the photosensitive member, and
wherein the detection image is used for detecting the density unevenness in a scanning direction in which the light from the light source scans the photosensitive member.

3. The image forming apparatus according to claim 2,
wherein the controller controls an intensity of the light corresponding to a plurality of areas on the photosensitive member in the scanning direction, and
wherein the intensity of the light corresponding to the plurality of areas differs in the different image forming conditions to form the plurality of test images.

4. The image forming apparatus according to claim 2,
wherein the controller converts image data based on conversion conditions corresponding to the plurality of areas on the photosensitive member in the scanning direction,
wherein the image forming unit forms the image based on the image data converted by the controller, and
wherein the conversion conditions corresponding to the plurality of areas differ in the different image forming conditions to form the plurality of test images.

5. The image forming apparatus according to claim 1,
wherein the image forming unit includes:
a rotational photosensitive drum;
a light source configured to expose the photosensitive member with light to form an electrostatic latent image; and
a developing roller configured to develop the electrostatic latent image on the photosensitive member, and
wherein the detection image is used for detecting the density unevenness in an axial direction of a rotational axis of the photosensitive member.

6. The image forming apparatus according to claim 5, wherein the controller controls an intensity of the light corresponding to the plurality of areas on the photosensitive member in the axial direction, and wherein the intensity of the light corresponding to the plurality of areas differs in the different image forming conditions to form the plurality of test images.

7. The image forming apparatus according to claim 5, wherein the image forming unit includes an image processor configured to convert image data based on conversion conditions corresponding to a plurality of areas on the photosensitive member in the axial direction, wherein the image forming unit forms the image based on the image data converted by the image processor, and wherein the conversion conditions corresponding to the plurality of areas differ in the different image forming conditions to form the plurality of test images.

8. The image forming apparatus according to claim 1, wherein the controller selects an image forming condition from the image forming conditions based on the selection information and suppresses the density unevenness by controlling the image forming unit based on the selected image forming condition.

9. The image forming apparatus according to claim 1, wherein the reader reads the detection image formed on a sheet.

10. The image forming apparatus according to claim 1, wherein the reader reads the plurality of test images.

11. The image forming apparatus according to claim 1, wherein the plurality of test images is formed on one sheet.

12. The image forming apparatus according to claim 1, wherein the plurality of test images is formed on a plurality of different sheets.

13. The image forming apparatus according to claim 1, wherein the plurality of test images includes a first test image and a second test image, wherein the first test image includes a plurality of images of different colors, and wherein the second test image includes the plurality of images of different colors.

14. The image forming apparatus according to claim 1, wherein the test image includes a plurality of images of different colors.

15. The image forming apparatus according to claim 1, wherein the plurality of test images includes a first test image and a second test image, wherein the different image forming conditions includes a first image forming condition for the first test image and a second image forming condition for the second test image, and wherein the controller generates the first image forming condition based on the density unevenness and a first coefficient, and generates the second image forming condition based on the density unevenness and a second coefficient different from the first coefficient.

* * * * *